US012750586B2

(12) United States Patent
Imamura

(10) Patent No.: US 12,750,586 B2
(45) Date of Patent: Sep. 29, 2026

(54) LENS BARREL

(71) Applicant: FUJIFILM Corporation, Tokyo (JP)

(72) Inventor: Hibiki Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 242 days.

(21) Appl. No.: 18/614,608

(22) Filed: Mar. 22, 2024

(65) Prior Publication Data

US 2024/0236493 A1 Jul. 11, 2024

Related U.S. Application Data

(63) Continuation of application No. PCT/JP2022/034710, filed on Sep. 16, 2022.

(30) Foreign Application Priority Data

Sep. 28, 2021 (JP) ................................ 2021-157567

(51) Int. Cl.
*H04N 23/55* (2023.01)
*H04N 23/69* (2023.01)

(52) U.S. Cl.
CPC ............. *H04N 23/69* (2023.01); *H04N 23/55* (2023.01)

(58) Field of Classification Search
CPC .......... H04N 23/69; H04N 23/55; G02B 7/02; G02B 7/04; G02B 7/08; G02B 7/10; G03B 17/02
See application file for complete search history.

(56) References Cited

U.S. PATENT DOCUMENTS 4,816,859 A * 3/1989 Maruyama ............. G02B 7/282 396/89
5,223,980 A * 6/1993 Hamasaki ................ G02B 7/10 359/705

(Continued)

FOREIGN PATENT DOCUMENTS

JP H03-108964 A 5/1991
JP 2013-092751 A 5/2013

(Continued)

OTHER PUBLICATIONS

Masatsugu Shimmeimae, et al., "Convex-Concave Perception in fingertip", The Virtual Realty Society of Japan, vol. 13, No. 1, Mar. 2008, pp. 101-103.

(Continued)

*Primary Examiner* — Bumsuk Won
*Assistant Examiner* — John C Sipes
(74) *Attorney, Agent, or Firm* — Studebaker Brackett PLLC

(57) ABSTRACT

Provided is a lens barrel capable of realizing a smooth operation of an optical system in a lens barrel body. A lens barrel (1) includes a variable-speed zooming lever (40) that is provided along an outer periphery of a lens barrel body (10) and a fixed protrusion portion (50) that is provided along the outer periphery of the lens barrel body (10), in which the variable-speed zooming lever (40) has a first surface (43) and the fixed protrusion portion (50) has a second surface (51). In a case where a position of the variable-speed zooming lever (40) is a reference position, the first surface (43) is flush with the second surface (51), and the variable-speed zooming lever (40) and the fixed protrusion portion (50) are movable relative to each other.

17 Claims, 17 Drawing Sheets

(56) References Cited

U.S. PATENT DOCUMENTS

| | | | | |
|---|---|---|---|---|
| 2002/0024747 | A1* | 2/2002 | Sato | G02B 7/10 359/701 |
| 2009/0059400 | A1* | 3/2009 | Koyama | G02B 7/10 359/825 |
| 2010/0066676 | A1* | 3/2010 | Kramer | G06F 3/0325 345/158 |
| 2011/0069403 | A1* | 3/2011 | Oikawa | G02B 7/102 359/817 |
| 2012/0075720 | A1* | 3/2012 | Iikawa | G02B 7/10 359/701 |
| 2013/0027789 | A1 | 1/2013 | Santo et al. | |
| 2013/0271860 | A1 | 10/2013 | Arakawa et al. | |
| 2014/0168792 | A1 | 6/2014 | Araki et al. | |
| 2014/0169781 | A1* | 6/2014 | Araki | G03B 17/14 396/529 |
| 2015/0049204 | A1 | 2/2015 | Okabe et al. | |
| 2016/0202448 | A1* | 7/2016 | Okada | G02B 7/102 359/701 |
| 2018/0233717 | A1 | 8/2018 | Motoyama et al. | |
| 2021/0157091 | A1 | 5/2021 | Yamazaki et al. | |
| 2021/0218902 | A1* | 7/2021 | Turcotte | H04N 23/67 |

FOREIGN PATENT DOCUMENTS

| | | | |
|---|---|---|---|
| JP | 2015-084070 | A | 4/2015 |
| WO | 2012/035779 | A1 | 3/2012 |
| WO | 2013/027317 | A1 | 2/2013 |
| WO | 2018/146861 | A1 | 8/2018 |
| WO | 2020/031374 | A1 | 2/2020 |

OTHER PUBLICATIONS

International Search Report issued in PCT/JP2022/034710; mailed Nov. 15, 2022.

International Preliminary Report On Patentability (Chapter I) and Written Opinion of the International Searching Authority issued in PCT/JP2022/034710; issued Apr. 2, 2024.

“Notice of Reasons for Refusal” Office Action issued in JP 2023-551324; mailed by the Japanese Patent Office on Feb. 12, 2026.

* cited by examiner 6-2

6-1

LENS BARREL

CROSS-REFERENCE TO RELATED APPLICATIONS

The present application is a Continuation of PCT International Application No. PCT/JP2022/034710 filed on Sep. 16, 2022 claiming priority under 35 U.S.C § 119(a) to Japanese Patent Application No. 2021-157567 filed on Sep. 28, 2021. Each of the above applications is hereby expressly incorporated by reference, in its entirety, into the present application.

BACKGROUND OF THE INVENTION

1. Field of the Invention

The present invention relates to a lens barrel, and more particularly, to a structure of a member provided in a lens barrel body.

2. Description of the Related Art

In the related art, a video camera has been suggested in which a ring-shaped electric zoom switch is attached to an outer peripheral portion of a lens barrel body (JP1991-108964A (JP-H03-108964A)).

The electric zoom switch is connected to a movable contact of a variable resistor, and causes a resistance value of the variable resistor to continuously change according to a rotational movement angle of the electric zoom switch. With the change in the resistance value of the variable resistor, a current supplied to a motor, which drives a zoom lens, is controlled to cause a zoom speed of the zoom lens to continuously change. Further, the electric zoom switch is pulled in directions opposite to each other by a pair of springs for self-returning, which enables the electric zoom switch to automatically return to a neutral position (position at which the zoom speed is zero). Furthermore, the electric zoom switch is integrally provided with a protruding portion that serves as a fingerhold.

Further, as a zoom operation member on an outer periphery of an outer frame of a lens barrel body, a lens barrel has been suggested in which a zoom lever switch is provided (WO2013/027317A). The zoom lever switch is a momentary operation type (self-returning type) switch that is provided to be movable in a circumferential direction of the outer frame thereof, and is a zoom operation member that causes a zoom speed to continuously change according to an amount of lever movement.

SUMMARY OF THE INVENTION

However, in recent years, a cinema camera having a new motion picture recording format or an interchangeable-lens digital camera specialized for a movie has been proposed. A zoom operation cannot be smoothly performed for these cameras as compared with an electronic news gathering (ENG) camera with a zoom demand for a broadcast station or the like.

Further, in a case of motion picture capturing, unlike still picture capturing, in the zoom operation, not only an image captured as a result of final enlargement or reduction but also a process of the enlargement or reduction is recorded. Thus, in viewing the motion picture, a method of imaging a subject, or the like, in conjunction with a zoom speed during zooming or panning is an important part of expression.

Accordingly, in a case where the zoom speed is jerky or the zoom speed is increased too much and then returned, it is difficult to view the motion picture and anything desired to be expressed cannot be expressed.

As described above, in the case of manual zoom in the motion picture capturing, it is difficult to control a stable zoom speed. Thus, variable-speed zooming is often used.

On the other hand, as a problem in the case of variable-speed zooming, since an imaging person performs imaging while viewing a finder image during the imaging, it is not possible for the imaging person to visually check an operation amount of a variable-speed zooming operation member. Thus, the only way to check the operation amount thereof is to feel how much the variable-speed zooming operation member is moved by hand and to view a change in angle of view through the finder.

However, in the checking by the viewing of the change in angle of view through the finder, the zoom speed is already increased in a case where the zoom speed is realized to be too fast, and only a feedback operation of reducing the zoom speed from the increased speed can be performed. Thus, as described above, with the sense of jerky movement, there is a problem that the video is difficult to view or the intention of video expression cannot be sufficiently conveyed.

On the contrary, in a case where the zoom speed is too slow, a dead zone (speed zero) of the variable speed is reached and stop→slow speed→stop is repeated, which often results in a jerky video.

A skilled imaging person, such as a broadcast station cameraman, remembers a corresponding zoom speed to be obtained in a case where the zoom operation member is operated, relying on the operational feeling of the zoom operation member (that is, relying on the operation amount of how much the zoom operation member is moved), and is good at making fine adjustment of the zoom speed.

However, in recent years, the number of places where expressions are presented on the network has increased, and there is an increasing demand for senders to perform camera imaging that requires an advanced expression technique. In this case, there is a case where a familiar commercially available digital camera or the like is used, instead of regular equipment for broadcasting, and a person having a low skill level operates the camera to perform variable-speed zooming imaging. Even in such a use, it is desired to realize a smooth variable-speed zooming that does not feel uncomfortable even for many people. However, there is no equipment that satisfies such a demand. Further, in a case where a movement speed of a focus lens is changed according to an operation amount of a focus operation member, a content or degree of the difficulty in viewing is different, but the difficulty in viewing is the same.

One embodiment according to the technique of the present disclosure provides a lens barrel capable of realizing a smooth operation of an optical system in a lens barrel body.

A lens barrel according to a first aspect of the present invention comprises a lens barrel including a first member that is provided along an outer periphery of a lens barrel body, and a second member that is provided along the outer periphery of the lens barrel body, in which the first member has a first surface, the second member has a second surface, and the first surface is flush with the second surface in a case where a position of the first member is a reference position, and the first member and the second member are movable relative to each other.

In the lens barrel according to a second aspect of the present invention, it is preferable that the first member has a cylindrical shape or an arc shape.

In the lens barrel according to a third aspect of the present invention, it is preferable that the first member is provided along the outer periphery of the lens barrel body in a rotationally movable manner, and a position of the first surface of the first member is rotatably displaced in a circumferential direction in a case where the first member is rotationally moved.

In the lens barrel according to a fourth aspect of the present invention, it is preferable that the second member is fixed to the lens barrel body.

In the lens barrel according to a fifth aspect of the present invention, it is preferable that the second member is adjacent to the first member and configures a part of an outer shape of the lens barrel body.

In the lens barrel according to a sixth aspect of the present invention, it is preferable that the first member is provided along the outer periphery of the lens barrel body in a rotationally movable manner, a first level-difference, in a case where the first member is rotationally moved in a first direction from the reference position, corresponding to a rotational movement amount is generated between the first surface and the second surface, and in a case where the first member is rotationally moved in a second direction opposite to the first direction from the reference position, a second level-difference in a direction opposite to the first level-difference, which corresponds to a rotational movement amount, is generated between the first surface and the second surface.

The lens barrel according to a seventh aspect of the present invention preferably further comprises a return member that returns the first member to the reference position.

In the lens barrel according to an eighth aspect of the present invention, it is preferable that the first member has a small-diameter portion and a large-diameter portion, and the first surface is configured of a surface that connects a level difference of diameters of the small-diameter portion and the large-diameter portion.

In the lens barrel according to a ninth aspect of the present invention, it is preferable that the second member configures a part of an outer shape of the lens barrel body, the part of the outer shape of the lens barrel body has a first outer shape corresponding to the small-diameter portion of the first member, the second member has a second outer shape corresponding to the large-diameter portion of the first member, and the second surface is configured of a surface that connects a level difference between the first outer shape of the lens barrel body and the second outer shape of the second member.

In the lens barrel according to a tenth aspect of the present invention, it is preferable that the first member and the second member are provided adjacent to each other in a lens optical axis direction, and the first surface of the first member and the second surface of the second member are simultaneously contactable with the same finger.

The lens barrel according to an eleventh aspect of the present invention preferably further comprises a zoom speed commander that issues a command for a zoom speed of electric zoom according to relative movement of the first member and the second member.

In the lens barrel according to a twelfth aspect of the present invention, it is preferable that the first member is provided along the outer periphery of the lens barrel body in a rotationally movable manner, and the zoom speed commander has a dead zone where a level difference between the first surface and the second surface is generated by rotational movement of the first member in a first direction or a second direction opposite to the first direction from the reference position, while the zoom speed to be commanded does not change from zero.

In the lens barrel according to a thirteenth aspect of the present invention, it is preferable that the first member is rotationally moved within a range of a first stroke angle, and a second stroke angle set in the dead zone is smaller than the first stroke angle.

In the lens barrel according to a fourteenth aspect of the present invention, it is preferable that the level difference between the first surface and the second surface at a boundary of the dead zone is equal to or larger than a concave-convex that is detectable by a sense of tactile of a finger, and the concave-convex is within a range obtained by adding a total of errors including a manufacturing error and an individual difference in detection.

In the lens barrel according to a fifteenth aspect of the present invention, it is preferable that the first surface and the second surface are configured of inclined surfaces.

The lens barrel according to a sixteenth aspect of the present invention preferably further comprises a third member that performs a zoom operation at a fixed speed.

In the lens barrel according to a seventeenth aspect of the present invention, it is preferable that the third member is a zoom switch that is provided in the second member to issue an instruction to perform zoom-up and zoom-down.

The lens barrel according to an eighteenth aspect of the present invention preferably further comprises a cylindrical-shaped fourth member that is rotatably disposed along the outer periphery of the lens barrel body, and a zoom position commander that issues a command for a zoom position of electric zoom according to a rotation amount of the fourth member.

In the lens barrel according to a nineteenth aspect of the present invention, it is preferable that the first member, the third member, and the fourth member are disposed adjacent to each other in an order of the fourth member, the first member, and the third member from an objective side of the lens barrel body.

In the lens barrel according to a twentieth aspect of the present invention, it is preferable that the first member and the fourth member have outer diameters similar to each other to such a degree that the outer diameters are felt to be equal to each other by a sense of tactile of a gripping finger.

DESCRIPTION OF THE PREFERRED EMBODIMENTS

Hereinafter, preferred embodiments of a lens barrel according to an embodiment of the present invention will be described with reference to accompanying drawings.

First, a zoom operation member in the related art will be described with reference to FIGS. 19 and 20, and a principle of the present invention will be described together.

Figure 19:
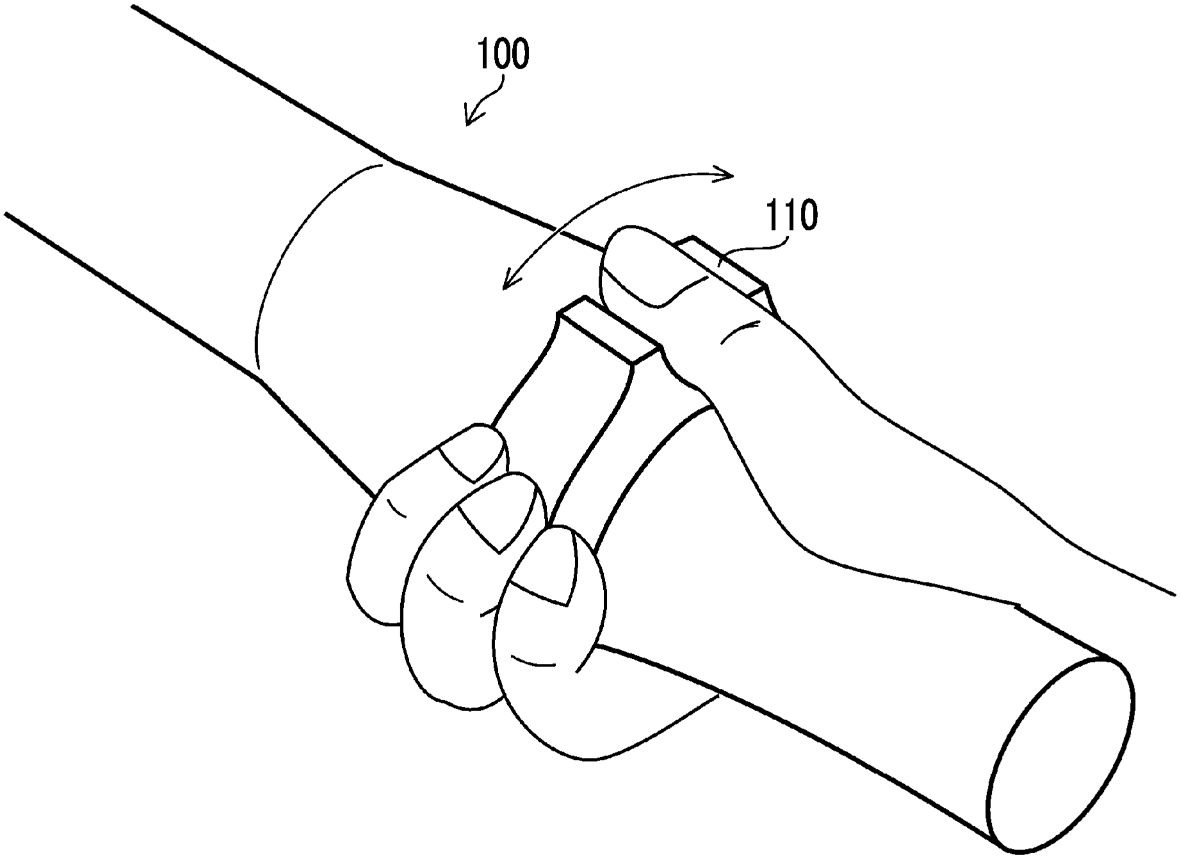
FIG. 19 is a perspective view of a handle of a pan head on which a television camera for broadcasting is mounted, the handle having a thumb ring which is a zoom operation member in the related art.

FIG. 19 is a perspective view of a handle of a pan head on which a television camera for broadcasting is mounted, the handle having a thumb ring which is the zoom operation member in the related art.

A television cameraman operates left and right handles provided on the pan head to pan or tilt the television camera for broadcasting (pan head), and operates a zoom demand and a focus demand, which are respectively attached to the left and right handles, to perform a zoom operation and focus adjustment of the television camera for broadcasting.

FIG. 19 shows a case where a thumb ring 110 constituting the zoom demand is attached to a handle 100 on a right side.

Figure 20:
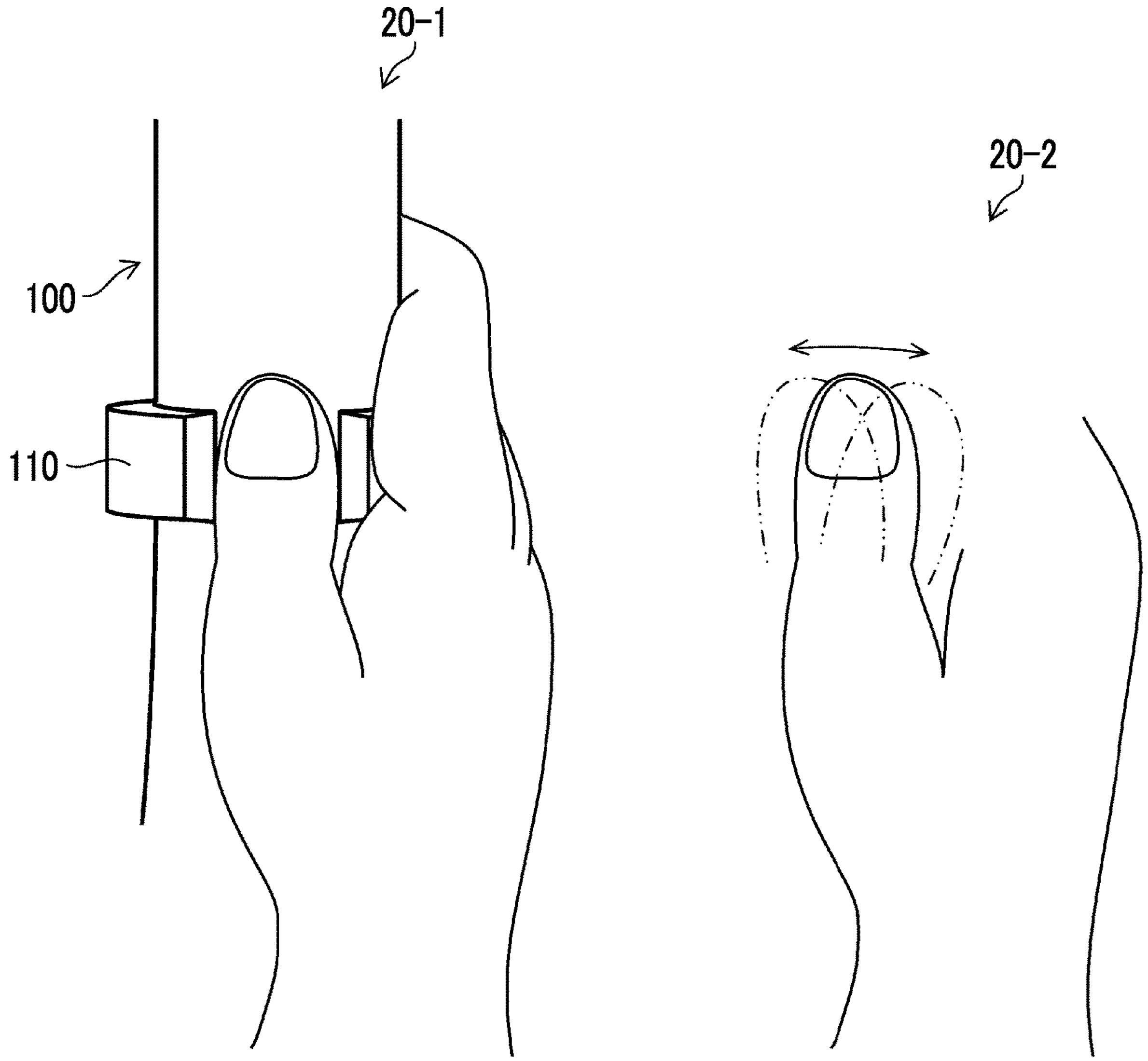
FIG. 20 is a top view of the handle shown in FIG. 19 and a diagram showing movement of a thumb operating the thumb ring.

FIG. 20 is a top view of the handle shown in FIG. 19 and a diagram showing movement of a thumb operating the thumb ring.

As shown in 20-1 of FIG. 20, the thumb ring 110 is operated by the thumb. In a case of the thumb ring 110, one point is that a relatively large rotational movement angle can be taken and a zoom curve is variable by user's selection. Further, an important point in adjusting a very small angle of the thumb ring 110 is to hold a grip of the handle 100 such that the finger is naturally straightened at a center position (zoom speed±0). Accordingly, as shown in 20-2 of FIG. 20, an amount of movement of the thumb in a left-right direction can be recognized by the user as a difference (=tilt amount) from being straightened. For a skilled person, a current operation amount of very small variable-speed zooming can be felt with the finger without any need to return the thumb ring 110 to zero each time to check the difference.

The zoom demand used in a video production field of a broadcast station is configured such that in a case where the thumb (thumb ring 110) is moved with respect to a hand holding the grip of the handle 100 as shown in FIG. 20, the variable-speed zooming is operated to change the zoom speed in accordance with the zoom curve set in advance with respect to the rotational movement angle of the thumb ring 110. In this case, the cameraman operating the zoom demand operates the zoom demand without viewing the hand while looking into a finder. In a case of a very small angle (slow-speed zoom), the thumb ring 110 is operated by slightly tilting an angle of the thumb left and right while a position of the grip is fixed. In a case of a large angle (high-speed zoom), all the hand holding the grip is rotated to cause the thumb ring 110 to be rotationally moved largely. However, the thumb ring 110 is particularly excellent in operability at the very small angle (slow-speed zoom).

The reason for this is that, as shown in 20-2 of FIG. 20, since the operation amount of the thumb for rotationally moving the thumb ring 110 can be felt with a sensory tilt degree of the thumb based on the experience with a position where the thumb is straightened as a reference, in a state where a wrist position is fixed with respect to the grip and only the thumb is swung to the left and right, it is possible to accurately understand a very fine operation amount.

The above is an application of a correct principle in terms of human engineering based on a principle that a human sense has a low ability to sense an absolute amount, whereas the human sense has a high ability to sense a relative difference. The zoom curve showing a relationship between the rotational movement angle of the thumb ring 110 and the zoom speed of the variable-speed zooming can be adjusted in a custom manner conforming to the operational feeling of the cameraman.

As can be seen from the above, the operation of the thumb ring 110 of the zoom demand has delicate operability.

However, it is difficult to employ the thumb ring, in terms of size and cost, in a digital movie camera, a mirrorless camera, or an interchangeable-lens cinema camera that is mainly used by a person belonging to an industry other than the broadcast industry for movie imaging.

The present inventor has focused on the following Paper 1.

Paper 1: "Convex-Concave Perception in fingertip" (based on a paper by Masatsugu Shimmeimae, et al., The University of Tokyo) https://tachilab.org/content/files/publication/tp/shinmeimae200803TVRSJ.pdf Paper 1 describes an experimental result that a human fingertip can sense, by placing the fingertip on a concave-convex on a horizontal surface (without sliding the fingertip), a convex having a height of 0.2 mm and a concave having a depth of 0.2 mm.

The present invention is to cause a fingertip of a user to detect a concave-convex to enable the user to accurately perceive a minute operation amount of an operation member, using a principle of natural law that perceptual ability of a human fingertip to perceive a level difference can perceive a much smaller amount than other perceptual ability such as visual observation.

With use of the above, it is possible to operate an operation member while understanding a relative difference (level difference) such as an operation amount (=difference) with respect to a reference position at zero speed, without increasing an outer shape dimension, as in an operation member of a mirrorless camera without a thumb ring or a digital movie camera, without a sense of incongruity in terms of design, and without a significant increase in cost, and thus it is possible to realize a smooth operation of an optical system in a lens barrel body even by an unskilled person.

Embodiments of Present Invention

<Schematic Configuration of Lens Barrel>

Figure 1:
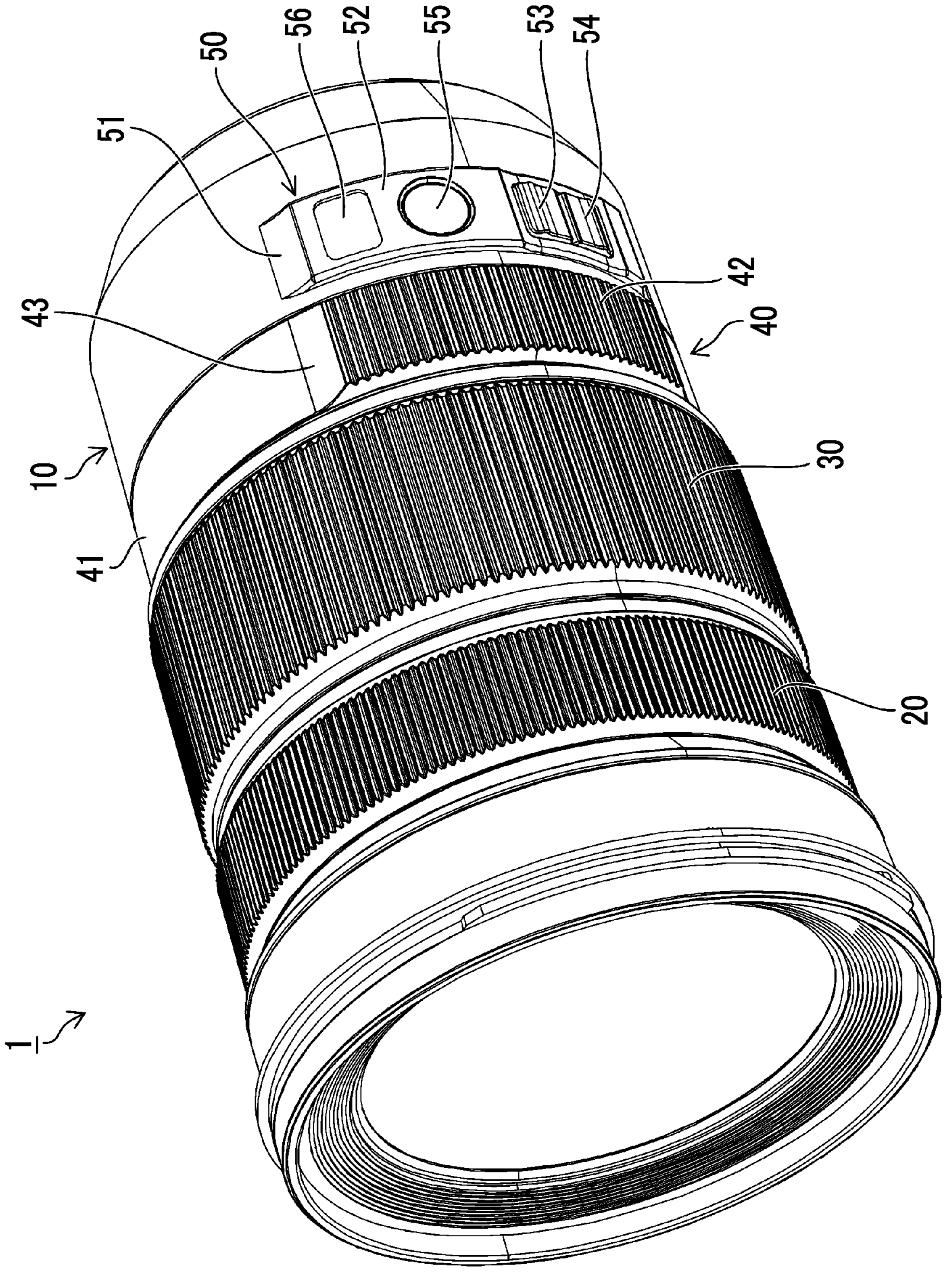
FIG. 1 is a perspective view of an embodiment of a lens barrel according to an embodiment of the present invention.

FIG. 1 is a perspective view of an embodiment of a lens barrel according to an embodiment of the present invention.

A lens barrel 1 shown in FIG. 1 is provided with a focus ring 20, a zoom ring 30 (fourth member), a variable-speed zooming lever 40 (first member), and a fixed protrusion portion 50 (second member) along an outer periphery of a lens barrel body 10, and the fixed protrusion portion 50 is provided with zoom switches 53 and 54 (third member).

Each of the focus ring 20 and the zoom ring 30 is a cylindrical-shaped operation member rotatably disposed along the outer periphery of the lens barrel body 10, and is an operation member of a 360-degree rotation type that rotates endlessly. Each of rotation amounts of the focus ring 20 and the zoom ring 30 is read by an encoder (not shown).

Further, a plurality of lens groups (not shown) are provided in the lens barrel 1. The plurality of lens groups includes a focus optical system that performs a focus operation by the operation of the focus ring 20, and a zooming optical system that performs a zoom operation by the operation of the zoom ring 30, the variable-speed zooming lever 40, or the zoom switches 53 and 54. The focus optical system and the zooming optical system may include the same lens group.

In a case where the focus ring 20 is rotated, the rotation amount thereof is read by the encoder. The focus optical system (focus lens) in the lens barrel body 10 is moved by a focus driving unit according to the rotation amount read by the encoder.

Similarly, in a case where the zoom ring 30 is rotated, the rotation amount thereof is read by the encoder. A variable magnification lens and a correction lens constituting the zooming optical system (zoom lens) are moved by a zoom driving unit according to the rotation amount read by the encoder, and thus a zoom magnification is changed.

The variable-speed zooming lever 40 is a cylindrical-shaped operation member that is provided along the outer periphery of the lens barrel body 10 in a rotationally movable manner, and is rotationally moved within a range of a predetermined first stroke angle. The variable-speed zooming lever 40 of the present example is rotationally moved within a range of the rotational movement angle of the predetermined first stroke angle (±12 degrees in this example) with reference to a position (reference position) shown in FIG. 1. The shape of the variable-speed zooming lever 40 is not limited to the cylindrical shape and may be an arc shape.

Further, the lens barrel 1 comprises a return member (not shown) that returns the variable-speed zooming lever 40 to the reference position. The return member includes a pin to be biased by springs in directions opposite to each other, and the variable-speed zooming lever 40 engages with the pin of the return member. In a case where a hand is released from the variable-speed zooming lever 40, the pin of the return member returns to the position (reference position) where spring-biased force is balanced, and the variable-speed zooming lever 40 also moves together with the pin to return to the reference position.

The lens barrel 1 is not limited to a lens barrel including the return member that causes the variable-speed zooming lever 40 to return to the reference position. For example, another configuration may be employed as long as a neutral position is present, such as a method of causing the user to know the neutral position by another method (providing a click feeling or the like) other than the return force.

The rotational movement angle of the variable-speed zooming lever 40 is detected by a linear sensor (not shown).

The lens barrel 1 comprises a zoom speed commander 70 (FIG. 18) that issues a command for the zoom speed of electric zoom according to the rotational movement angle of the variable-speed zooming lever 40. Therefore, in a case where the variable-speed zooming lever 40 is rotationally moved and the rotational movement angle of the variable-speed zooming lever 40 is detected by the linear sensor, the zoom lens (the variable magnification lens and the correction lens) is driven to have the zoom speed following a zoom speed command according to the rotational movement angle of the variable-speed zooming lever 40, which is detected by the linear sensor, and thus the variable-speed zooming is realized.

Further, on an outer shape (outer shape on lens-mount side) of the lens barrel body 10, the fixed protrusion portion 50 (second member) constituting a part of the outer shape thereof is integrally formed. The variable-speed zooming lever 40 and the fixed protrusion portion 50 are provided adjacent to each other in a lens optical axis direction.

The fixed protrusion portion 50 is provided with the zoom switches 53 and 54 (third member) that perform a zoom operation at a fixed speed.

The zoom switch 53 is a switch that issues an instruction to perform the zoom operation (zoom-up) at a fixed speed in a telephoto direction. The zoom switch 54 is a switch that issues an instruction to perform the zoom operation (zoom-down) at a fixed speed in a wide-angle direction. The fixed speed can be adjusted by the user in a custom manner.

Therefore, it is preferable to use the zoom switches 53 and 54 in a case where the zoom operation is performed in the telephoto direction or the wide-angle direction at the fixed speed.

Further, the fixed protrusion portion 50 is provided with a focus lock switch 55 that performs focus lock and focus unlock, and a display unit 56 that displays a focus lock state or a focus unlock state at a position adjacent to the focus lock switch 55.

<Shapes of Variable-Speed Zooming Lever and Fixed Protrusion Portion>

Next, shapes of the variable-speed zooming lever 40, the fixed protrusion portion 50, and the like will be described with reference to FIGS. 1 to 5.

Figure 2:
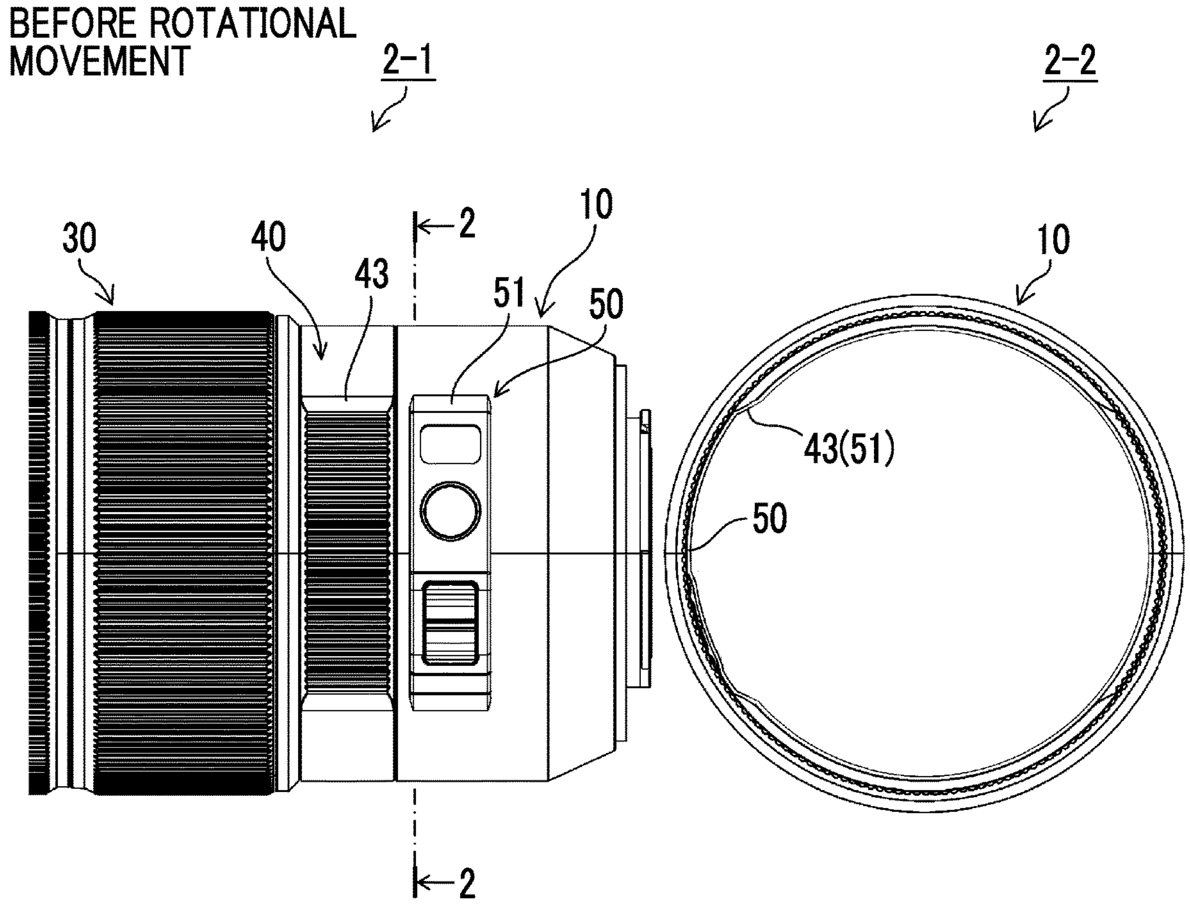
FIG. 2 is a side view of a main part of the lens barrel shown in FIG. 1 before a variable-speed zooming lever is rotationally moved and a cross-sectional view taken along a line 2-2 in the side view of the main part.

FIG. 2 is a side view of a main part of the lens barrel shown in FIG. 1 before the variable-speed zooming lever is rotationally moved and a cross-sectional view taken along a line 2-2 in the side view of the main part.

Figure 3:
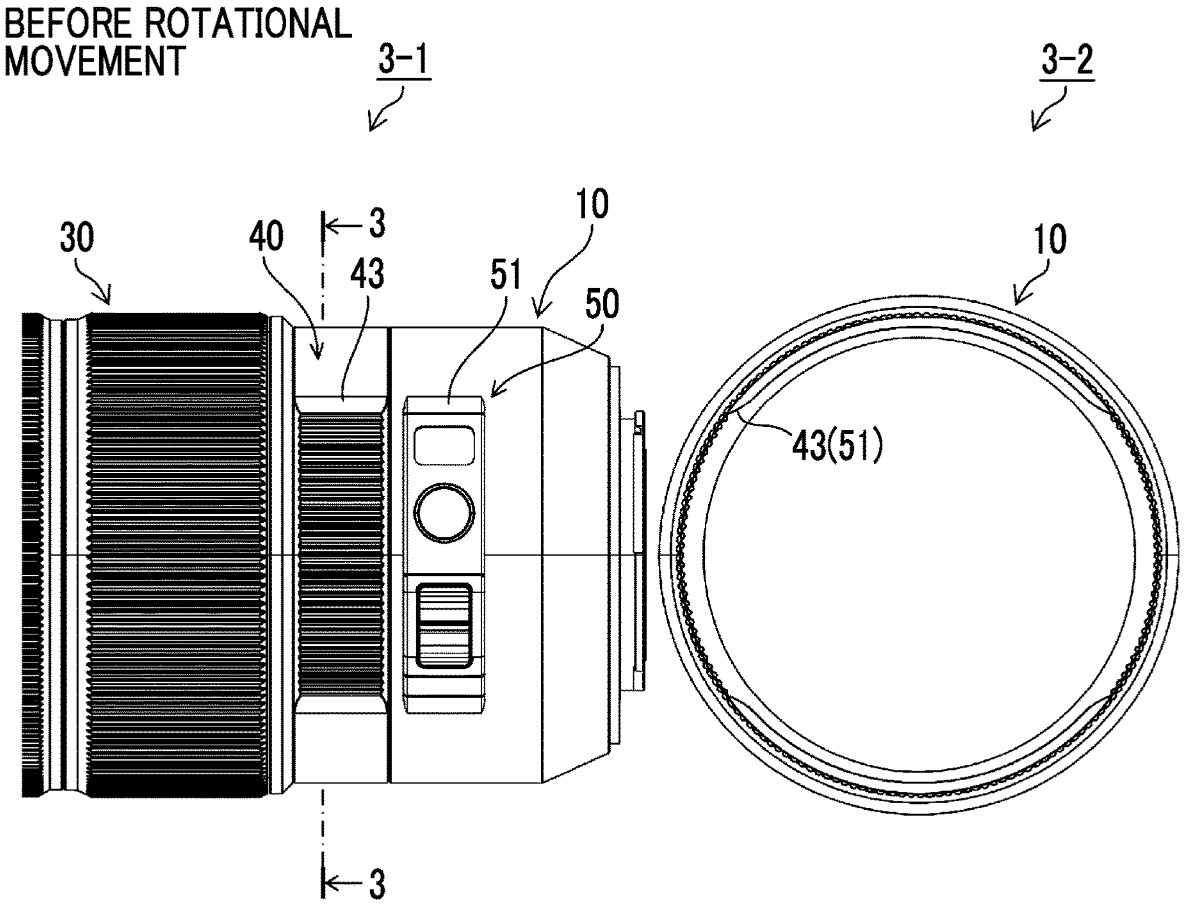
FIG. 3 is the side view of the main part of the lens barrel shown in FIG. 1 before the variable-speed zooming lever is rotationally moved and a cross-sectional view taken along a line 3-3 in the side view of the main part.

FIG. 3 is the side view of the main part of the lens barrel shown in FIG. 1 before the variable-speed zooming lever is rotationally moved and a cross-sectional view taken along a line 3-3 in the side view of the main part.

The side view of the main part of the lens barrel shown in 2-1 of FIG. 2 is the same as the side view of the main part of the lens barrel shown in 3-1 of FIG. 3. Further, the cross-sectional view shown in 2-2 of FIG. 2 is a cross-sectional view at a position of the fixed protrusion portion 50, and the cross-sectional view shown in 3-2 of FIG. 3 is a cross-sectional view at a position of the variable-speed zooming lever 40. The cross-sectional positions of both of the cross-sectional views are different from each other.

Figure 4:
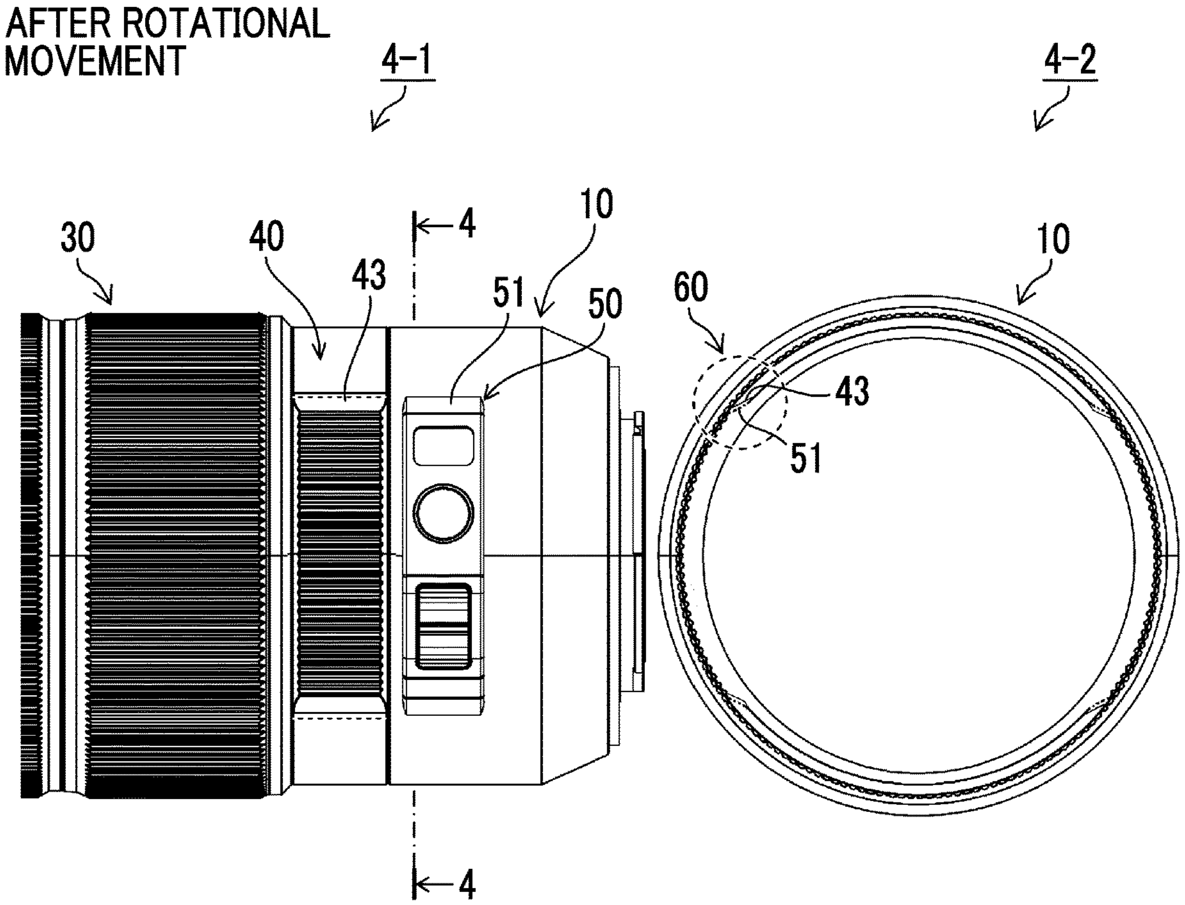
FIG. 4 is a side view of the main part of the lens barrel shown in FIG. 1 after the variable-speed zooming lever is rotationally moved and a cross-sectional view taken along a line 4-4 in the main part side view.

FIG. 4 is a side view of the main part of the lens barrel shown in FIG. 1 after the variable-speed zooming lever is rotationally moved and a cross-sectional view taken along a line 4-4 in the main part side view.

Figure 5:
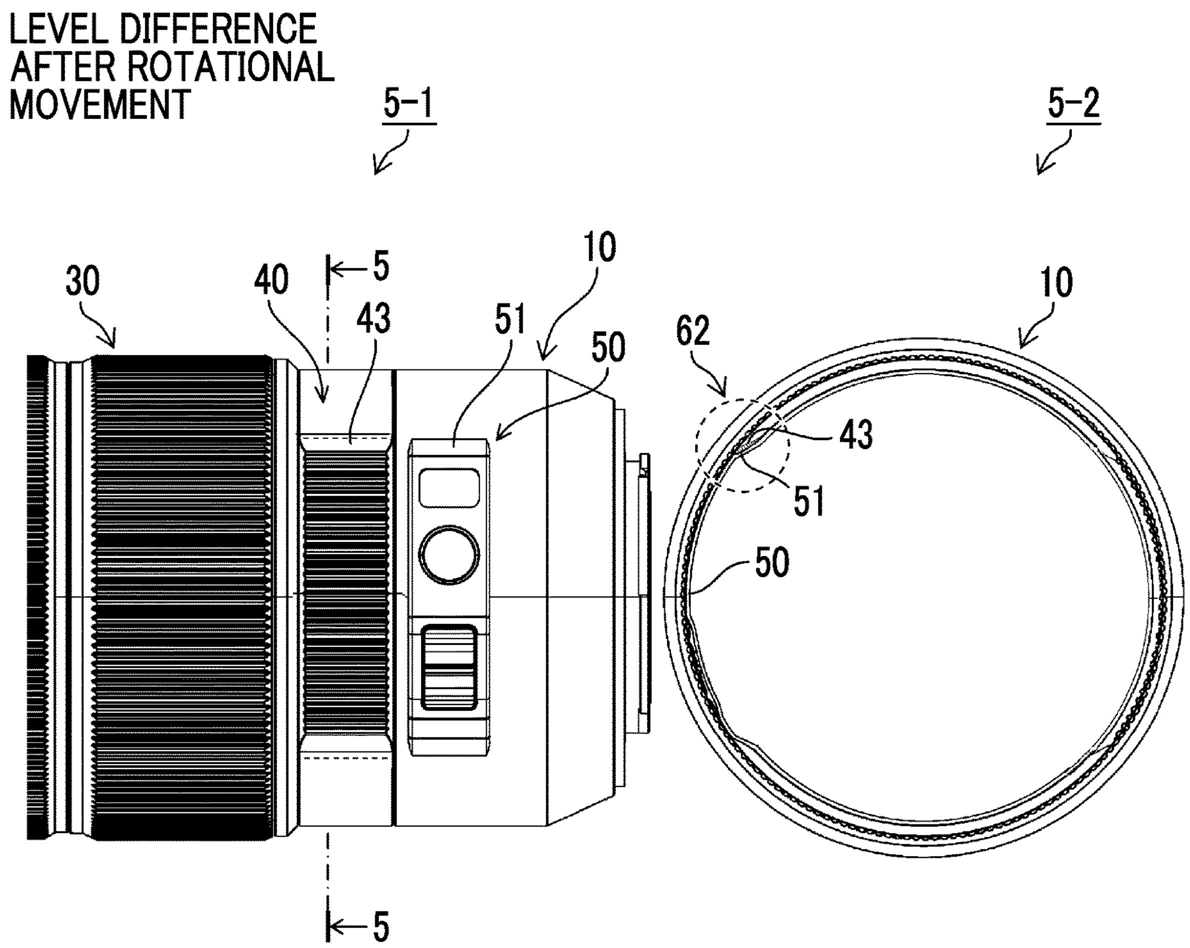
FIG. 5 is the side view of the main part of the lens barrel shown in FIG. 1 after the variable-speed zooming lever is rotationally moved and a cross-sectional view taken along a line 5-5 in the main part side view.

FIG. 5 is the side view of the main part of the lens barrel shown in FIG. 1 after the variable-speed zooming lever is rotationally moved and a cross-sectional view taken along a line 5-5 in the main part side view.

The side view of the main part of the lens barrel shown in 4-1 of FIG. 4 is the same as the side view of the main part of the lens barrel shown in 5-1 of FIG. 5. Further, the cross-sectional view shown in 4-2 of FIG. 4 is a cross-sectional view at the position of the fixed protrusion portion 50, and the cross-sectional view shown in 5-2 of FIG. 5 is a cross-sectional view at the position of the variable-speed zooming lever 40. The cross-sectional positions of both of the cross-sectional views are different from each other.

Contents of the lens barrel body 10 are omitted in the cross-sectional views shown in FIGS. 2 to 5.

As shown in FIGS. 1 to 5, the variable-speed zooming lever 40 includes a small-diameter portion 41 and a large-diameter portion 42, and comprises a surface (first surface) 43 that connects a level difference in diameters of the small-diameter portion 41 and the large-diameter portion 42. Regarding the first surface 43, in a case where the variable-speed zooming lever 40 is rotationally moved, a position of the first surface 43 is rotatably displaced in a circumferential direction.

The variable-speed zooming lever 40 (upper surface of the large-diameter portion 42) and the zoom ring 30 have outer diameters similar to each other to such a degree that the outer diameters are felt to be equal to each other by a sense of tactile of a gripping finger. Further, the variable-speed zooming lever 40 (upper surface of the large-diameter portion 42) may have an outer diameter larger than the outer diameter of the zoom ring 30 within a range that is felt to be equal by the sense of tactile of the gripping finger.

Accordingly, the user can recognize that the one with a larger outer diameter is the variable-speed zooming lever 40. Further, in a case where the user moves the finger from a movable protrusion portion 42 of the variable-speed zooming lever 40 to the zoom ring 30 or in a case where the user moves the finger from the zoom ring 30 to the movable protrusion portion 42, the user can smoothly move the finger.

The large-diameter portion 42 of the variable-speed zooming lever 40 protrudes from the small-diameter portion 41, is formed with a knurling for slip prevention, and is configured to be easy to rotationally move the variable-speed zooming lever 40 by being gripped. Hereinafter, the large-diameter portion 42 of the variable-speed zooming lever 40 is also referred to as "movable protrusion portion 42".

As represented by the cross-sectional view of 3-2 of FIG. 3 and the cross-sectional view of 5-2 of FIG. 5, two movable protrusion portions 42 of the variable-speed zooming lever 40 are disposed at positions symmetrical to a center of rotational movement of the variable-speed zooming lever 40.

The small-diameter portion 41 of the variable-speed zooming lever 40 has the same diameter as the outer shape of the lens barrel body 10 on which the fixed protrusion portion 50 is provided, and both the small-diameter portion 41 and the lens barrel body 10 are flush with each other.

On the other hand, the fixed protrusion portion 50 constituting the part of the outer shape of the lens barrel body 10 on the lens-mount side has substantially the same shape as the movable protrusion portion 42 of the variable-speed zooming lever 40.

That is, the part of the outer shape of the lens barrel body 10 on the lens-mount side has an outer shape (first outer shape) of the same diameter as the small-diameter portion 41 of the variable-speed zooming lever 40, and the fixed protrusion portion 50 has an outer shape (second outer shape) of the same diameter as the large-diameter portion (movable protrusion portion 42) of the variable-speed zooming lever 40. Further, the fixed protrusion portion 50 has an upper surface 52 that is flush with the upper surface of the movable protrusion portion 42, and a height of the fixed protrusion portion 50 is the same as a height of the movable protrusion portion 42.

Furthermore, the fixed protrusion portion 50 is formed with a surface (second surface) 51 that connects a level difference between the first outer shape of the lens barrel body 10 and the upper surface 52 (second outer shape) of the fixed protrusion portion 50. The second surface 51 has the same shape as the first surface 43 of the movable protrusion portion 42 of the variable-speed zooming lever 40. In a case where the variable-speed zooming lever 40 is at the reference position, the first surface 43 of the movable protrusion portion 42 of the variable-speed zooming lever 40 is substantially flush with the second surface 51 of the fixed protrusion portion 50 (zero level difference) (refer to FIGS. 1 to 3).

Each of the first surface 43 of the movable protrusion portion 42 of the variable-speed zooming lever 40 and the second surface 51 of the fixed protrusion portion 50 of the present example is configured of an inclined surface. Accordingly, the movable protrusion portion 42 of the variable-speed zooming lever 40 and the fixed protrusion portion 50 are formed to have an aesthetic appearance and not to cause injury functionally. The first surface 43 and the second surface 51 may not necessarily be inclined surfaces.

In a case where the variable-speed zooming lever 40 is rotationally moved, a level difference corresponding to a rotational movement amount of the variable-speed zooming lever 40, as indicated by a reference numeral 60 in FIG. 4 and a reference numeral 62 in FIG. 5, is generated between the first surface 43 of the movable protrusion portion 42 of the variable-speed zooming lever 40 and the second surface 51 of the fixed protrusion portion 50.

FIGS. 4 and 5 show a case where the variable-speed zooming lever 40 is rotationally moved slightly from the reference position in a first direction (clockwise direction in the cross-sectional views shown in 4-2 of FIGS. 4 and 5-2 of FIG. 5).

In this case, in a case where the first surface 43 of the movable protrusion portion 42 of the variable-speed zooming lever 40 is used as a reference, the second surface 51 of the fixed protrusion portion 50 is lower than the second surface 51, and a level difference (first level-difference) of concave is generated.

On the other hand, in a case where the variable-speed zooming lever 40 is rotationally moved from the reference position in a second direction (direction opposite to the first direction), the second surface 51 of the fixed protrusion portion 50 is higher than the second surface 51, and a level difference of convex (second level-difference) is generated. The first direction of the present example is the telephoto direction, and the second direction is the wide-angle direction.

<Action of Lens Barrel>

Next, an action of the lens barrel 1 having the above-mentioned configuration will be described.

Figure 6:
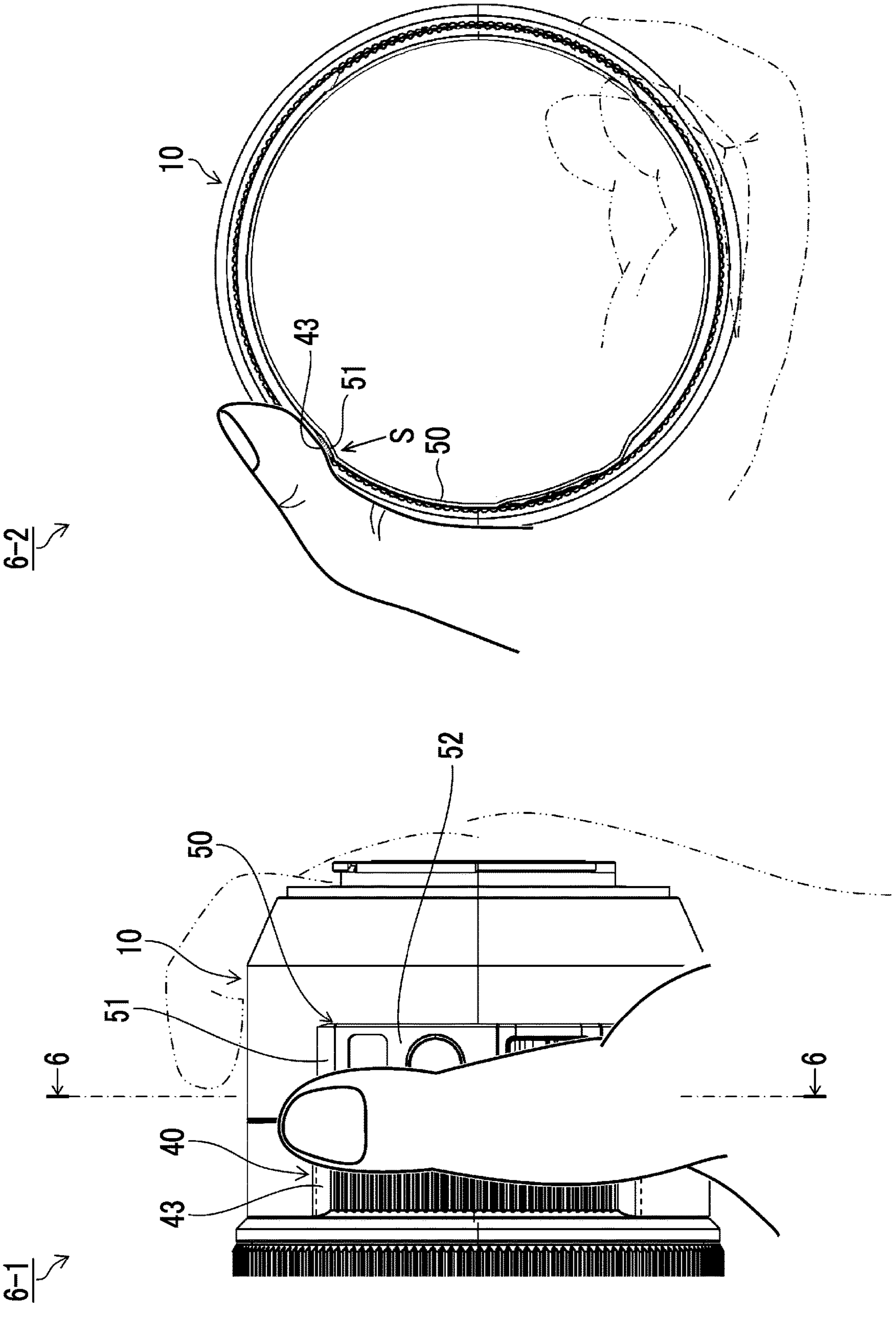
FIG. 6 is a diagram in which an illustration of a hand operating the variable-speed zooming lever is added to the side view of the main part and the cross-sectional view shown in FIG. 5.

FIG. 6 is a diagram corresponding to FIG. 5, and particularly, a diagram in which an illustration of a hand operating the variable-speed zooming lever is added.

In a case where the variable-speed zooming lever 40 is rotationally moved from the reference position as shown in FIG. 6, a fingertip (fingertip of thumb) is placed to be in contact with each of the first surface 43 of the movable protrusion portion 42 of the variable-speed zooming lever 40 and the second surface 51 of the fixed protrusion portion 50 (6-1 of FIG. 6). That is, the first surface 43 and the second surface 51 are simultaneously contactable with the same finger (thumb). Since the first surface 43 of the movable protrusion portion 42 is flush with the second surface 51 of the fixed protrusion portion 50 before the rotational movement of the variable-speed zooming lever 40, the fingertip can perceive that the level difference is not generated.

Thereafter, in a case where the variable-speed zooming lever 40 is rotationally moved in the telephoto direction (clockwise direction in the cross-sectional view shown in 6-2 of FIG. 6) as shown in FIG. 6, a level difference S is generated between the first surface 43 of the movable protrusion portion 42 and the second surface 51 of the fixed protrusion portion 50, and the fingertip can perceive this level difference.

The experimental result of Paper 1 described above shows that in a case where the fingertip is placed on the concave-convex on the horizontal surface, the human fingertip can perceive the convex having the height of 0.2 mm and the concave having the depth of 0.2 mm. However, the human fingertip can also perceive the concave-convex of 0.2 mm or less, and since the level difference generated by the rotational movement of the variable-speed zooming lever 40 gradually increases from a zero level difference state (since the level difference dynamically changes), the human fingertip can perceive the level difference smaller than 0.2 mm. An amount of level difference that can be perceived in this case corresponds to a very small angle with respect to a total rotation angle of the variable-speed zooming lever 40. Therefore, in a case where an operation of a minute angle required for the operation of the variable-speed zooming lever 40 is performed, it is possible to obtain very important information.

Further, the experiment of Paper 1 shows the experimental result that in a case where the fingertip is placed on a concave or convex having a width of 3 mm formed on the horizontal surface, most humans can perceive the concave having the depth of 0.2 mm and the convex having the height of 0.2 mm with the fingertip. However, these concave and convex are not the same as the level difference between the two surfaces (the first surface 43 and the second surface 51). However, since the concave or convex used in the experiment of Paper 1 has the width of 3 mm, it is considered that it is easier to perceive the concave or convex in a case where the finger is placed on a portion of edge (level difference) of the concave or convex than in a case where the finger is placed in the middle of the concave or convex having the width of 3 mm.

That is, the level difference between the first surface 43 and the second surface 51 can be perceived with the fingertip in a case where there is the level difference of 0.2 mm or in a case where there is the level difference of about 0.2 mm.

1) Slow-Speed Zoom Region

Figure 7:
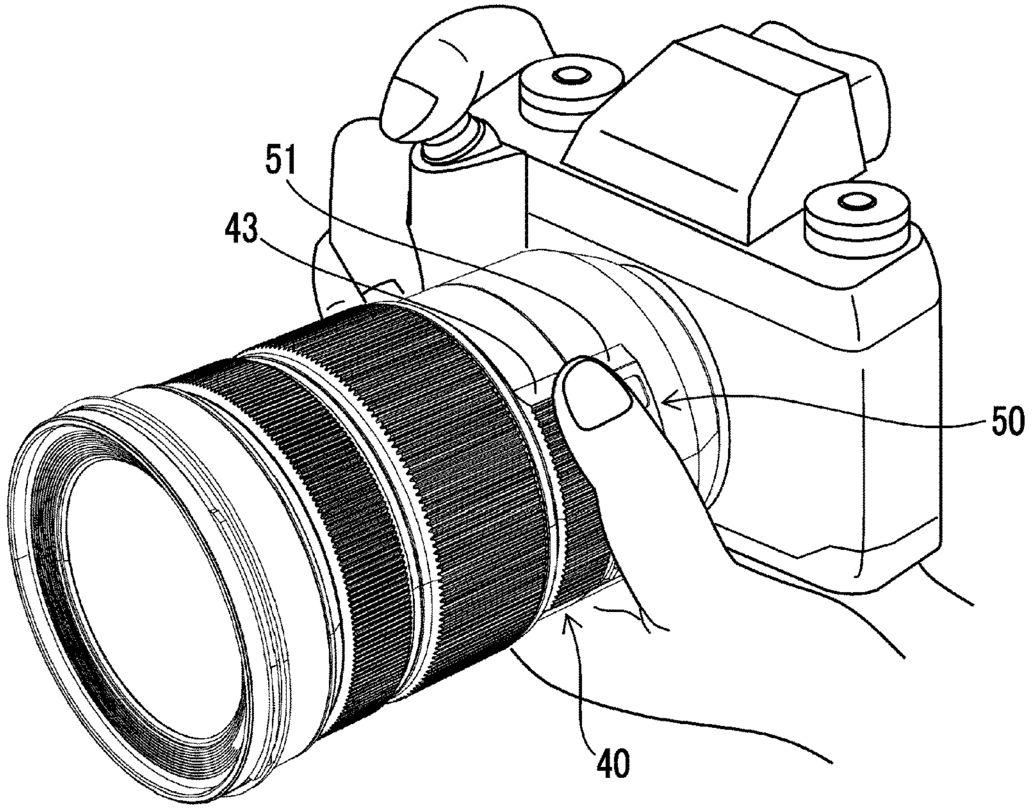
FIG. 7 is a perspective view of an imaging device including the lens barrel according to an embodiment of the present invention, and is a diagram including the perspective view of the imaging device before the variable-speed zooming lever is rotationally moved and the illustration of the hand operating the variable-speed zooming lever.

FIG. 7 is a perspective view of an imaging device including the lens barrel according to an embodiment of the present invention, and is particularly a diagram including the perspective view of the imaging device before the variable-speed zooming lever is rotationally moved and the illustration of the hand operating the variable-speed zooming lever.

In a case where the variable-speed zooming lever 40 is rotationally moved in a slow-speed zoom range of about 0 to 3 degrees, the thumb is placed between the first surface 43 of the movable protrusion portion 42 and the second surface 51 of the fixed protrusion portion 50 to feel a fine rotational movement amount of the variable-speed zooming lever 40.

Although not clearly shown in FIG. 7, a pad of the thumb is in contact with both the first surface 43 and the second surface 51. In a case where the level difference is generated between the first surface 43 and the second surface 51, the pad of the thumb is in contact with at least an edge portion corresponding to the level difference between the first surface 43 and the second surface 51.

In a case where the variable-speed zooming lever 40 performs an extremely low-speed zoom operation without a sudden screen change, with checking of a slight difference in the level difference between the first surface 43 and the second surface 51 by the sense of tactile of the finger, it is possible to adjust the rotational movement amount of the variable-speed zooming lever 40 more finely than adjustment by visual observation of a scale or the like.

As shown in FIG. 7, before the variable-speed zooming lever 40 is rotationally moved (in a case where the variable-speed zooming lever 40 is at the reference position), the first surface 43 is flush with the second surface 51 (the level difference is zero), and thus the fingertip cannot perceive the level difference. In this case, the user can recognize that the variable-speed zooming lever 40 is not rotationally moved or that the level difference is less than 0.2 mm and the variable-speed zooming lever 40 is not rotationally moved substantially.

Figure 8:
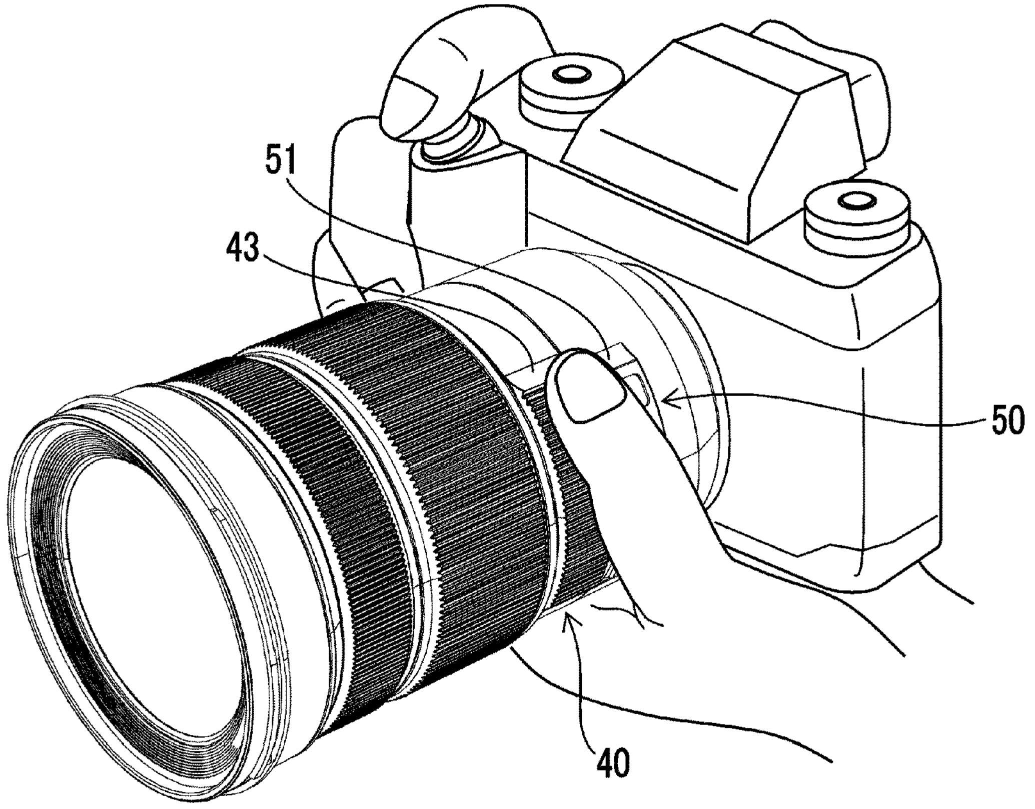
FIG. 8 is the perspective view of the imaging device including the lens barrel according to an embodiment of the present invention, and is a diagram including the perspective view of the imaging device in a case where the variable-speed zooming lever is rotationally moved in a telephoto direction and the illustration of the hand operating the variable-speed zooming lever.

FIG. 8 is the perspective view of the imaging device including the lens barrel according to an embodiment of the present invention, and is particularly a diagram including the perspective view of the imaging device in a case where the variable-speed zooming lever is rotationally moved in the telephoto direction and the illustration of the hand operating the variable-speed zooming lever.

In a case where the variable-speed zooming lever 40 is rotationally moved in the telephoto direction as shown in FIG. 8, the level difference is generated between the first surface 43 of the movable protrusion portion 42 and the second surface 51 of the fixed protrusion portion 50 as described with reference to FIG. 6 or the like. In this case, the level difference is a level difference (first level-difference) in which the second surface 51 of the fixed protrusion portion 50 is lower than the first surface 43 of the movable protrusion portion 42.

In a case where the level difference between the first surface 43 and the second surface 51 is 0.2 mm or more, the user can perceive the level difference therebetween with the fingertip. In a minute rotational movement range of the variable-speed zooming lever 40, the level difference corresponding to (substantially proportional to) the rotational movement amount of the variable-speed zooming lever 40 is generated. In a case where the user is accustomed to using the imaging device provided with the lens barrel 1 to a certain extent, the user can recognize the rotational movement angle of the variable-speed zooming lever 40 from the level difference (first level-difference) perceived with the fingertip and thus the zoom speed command in the telephoto direction.

Figure 9:
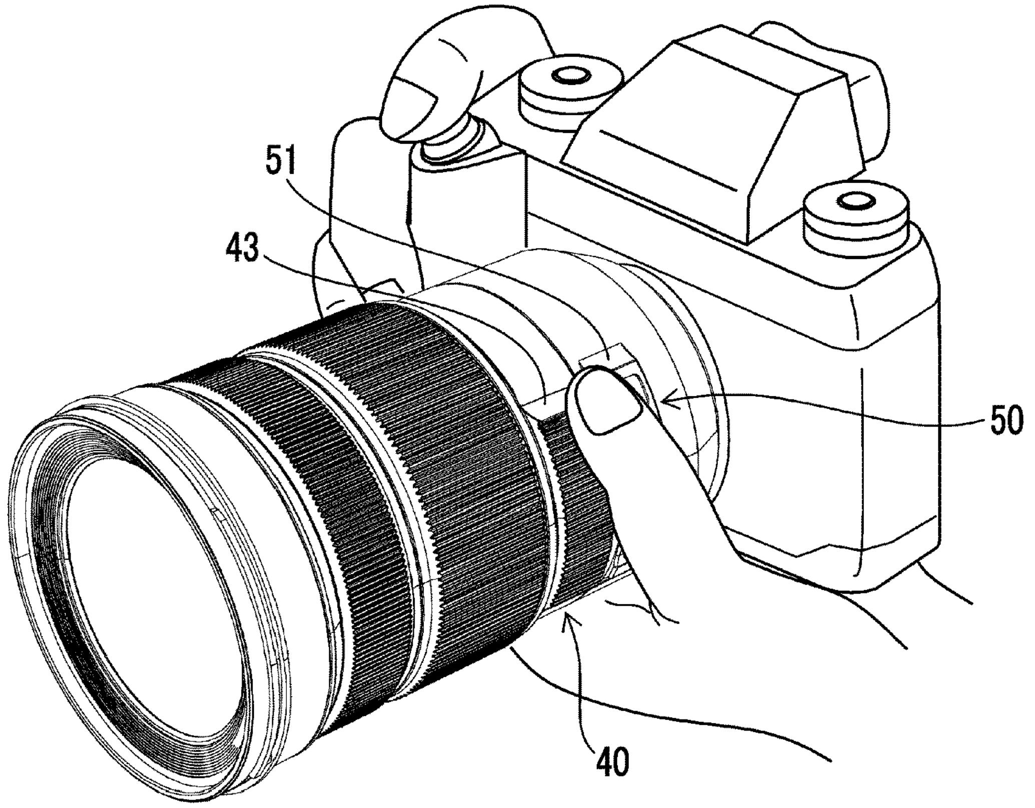
FIG. 9 is the perspective view of the imaging device including the lens barrel according to an embodiment of the present invention, and is a diagram including the perspective view of the imaging device in a case where the variable-speed zooming lever is rotationally moved in a wide-angle direction and the illustration of the hand operating the variable-speed zooming lever.

FIG. 9 is the perspective view of the imaging device including the lens barrel according to an embodiment of the present invention, and is particularly a diagram including the perspective view of the imaging device in a case where the variable-speed zooming lever is rotationally moved in the wide-angle direction and the illustration of the hand operating the variable-speed zooming lever.

In a case where the variable-speed zooming lever 40 is rotationally moved in the wide-angle direction as shown in FIG. 9, the level difference is generated between the first surface 43 of the movable protrusion portion 42 and the second surface 51 of the fixed protrusion portion 50 as in the case where the variable-speed zooming lever 40 is rotationally moved in the telephoto direction. In this case, the level difference is a level difference (second level-difference) in which the second surface 51 of the fixed protrusion portion 50 is higher than the first surface 43 of the movable protrusion portion 42.

The user can recognize the rotational movement angle of the variable-speed zooming lever 40 from the level difference (second level-difference) perceived with the fingertip and thus the zoom speed command in the wide-angle direction.

2) High-Speed Zoom Region

Figure 10:
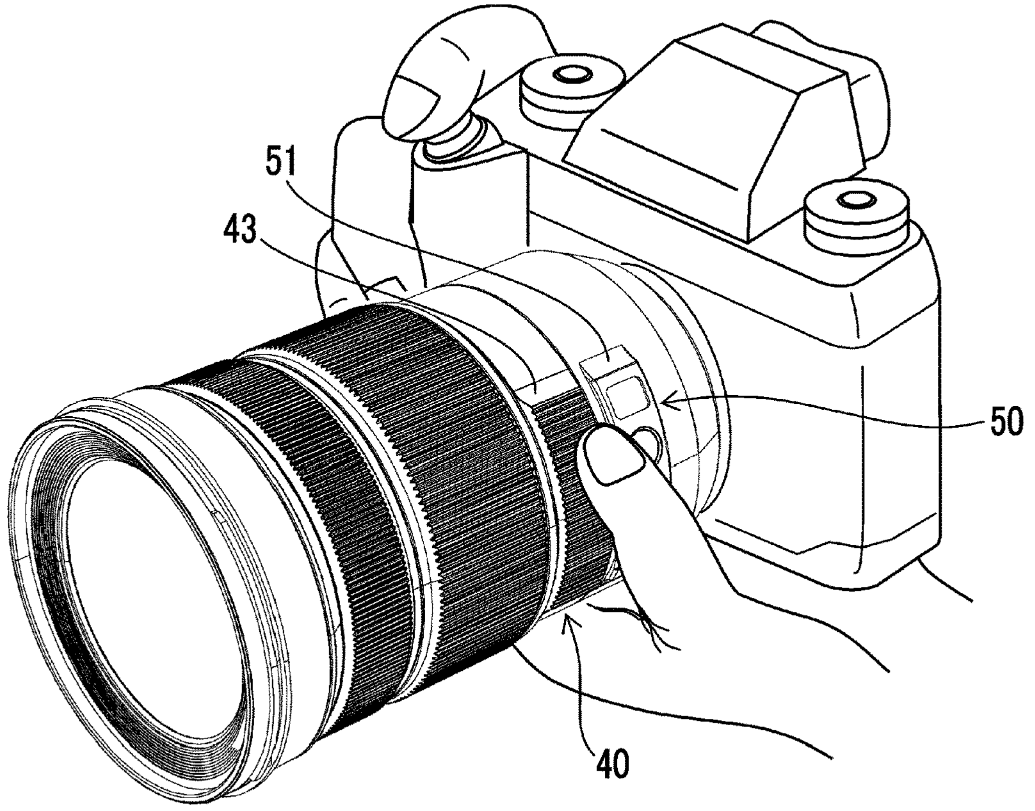
FIG. 10 is the perspective view of the imaging device including the lens barrel according to an embodiment of the present invention, and is a diagram including the perspective view of the imaging device before the variable-speed zooming lever is rotationally moved and the illustration of the hand operating the variable-speed zooming lever.

FIG. 10 is the perspective view of the imaging device including the lens barrel according to an embodiment of the present invention, and is a diagram including the perspective view of the imaging device before the variable-speed zooming lever is rotationally moved and the illustration of the hand operating the variable-speed zooming lever. FIG. 10 shows a position of the thumb, and the like, with respect to the variable-speed zooming lever 40 in a case where the zoom operation is performed in a high-speed zoom region.

Figure 11:
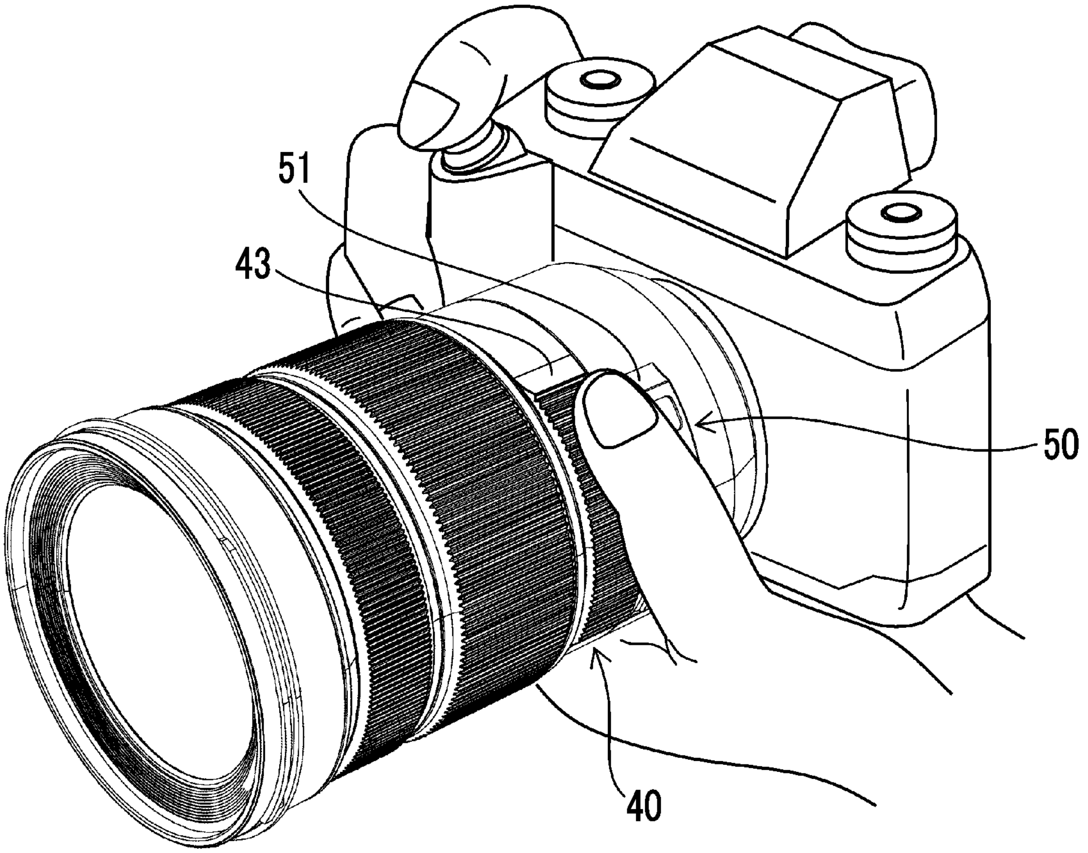
FIG. 11 is the perspective view of the imaging device including the lens barrel according to an embodiment of the present invention, and is a diagram including the perspective view of the imaging device in a case where the variable-speed zooming lever is rotationally moved in a telephoto direction at a predetermined angle and the illustration of the hand operating the variable-speed zooming lever.

Further, FIG. 11 is the perspective view of the imaging device including the lens barrel according to an embodiment of the present invention, and is a diagram including the perspective view of the imaging device in a case where the variable-speed zooming lever is rotationally moved in the telephoto direction at a predetermined angle and the illustration of the hand operating the variable-speed zooming lever.

FIG. 11 shows a state where the variable-speed zooming lever 40 is rotationally moved in the telephoto direction from the state shown in FIG. 10 by the rotational movement amount corresponding to the rotational movement amount in the high-speed zoom region. The position of the thumb with respect to the variable-speed zooming lever 40 is the same as in the case of FIG. 10.

In a case where the variable-speed zooming lever 40 is rotationally moved from the reference position of the variable-speed zooming lever 40 shown in FIG. 10, the thumb is brought into contact with the second surface 51, which is a terminal end of the fixed protrusion portion 50, at a rotational movement position shown in FIG. 11. Accordingly, the user can know a specific rotational movement amount in the high-speed zoom region by tactile sense of the fingertip. As described above, even in a case where the operation angle is large, the fingertip can sense the operation amount depending on the position where the finger is placed.

In both cases of the zoom operations in the slow-speed zoom region and the high-speed zoom region, with matching (flushness) between the first surface 43 of the movable protrusion portion 42 of the variable-speed zooming lever 40 and the second surface 51 of the fixed protrusion portion 50 in a case of non-operation, it is possible to know an amount of zoom operation of the variable-speed zooming lever 40 by the feeling with the fingertip of the level difference caused by a deviation amount between the first surface 43 and the second surface 51 in a case of the zoom operation, and to perform a fine operation that is not accompanied by movement of the zoom operation in and out in operating a motion picture.

<Zoom Curve>

A relationship between the rotational movement angle of the variable-speed zooming lever 40 and the zoom speed is not proportional and is represented by a logarithmic curve or a sine curve. This is because zoom speed control in a low-speed zoom region is extremely important.

Figure 12:
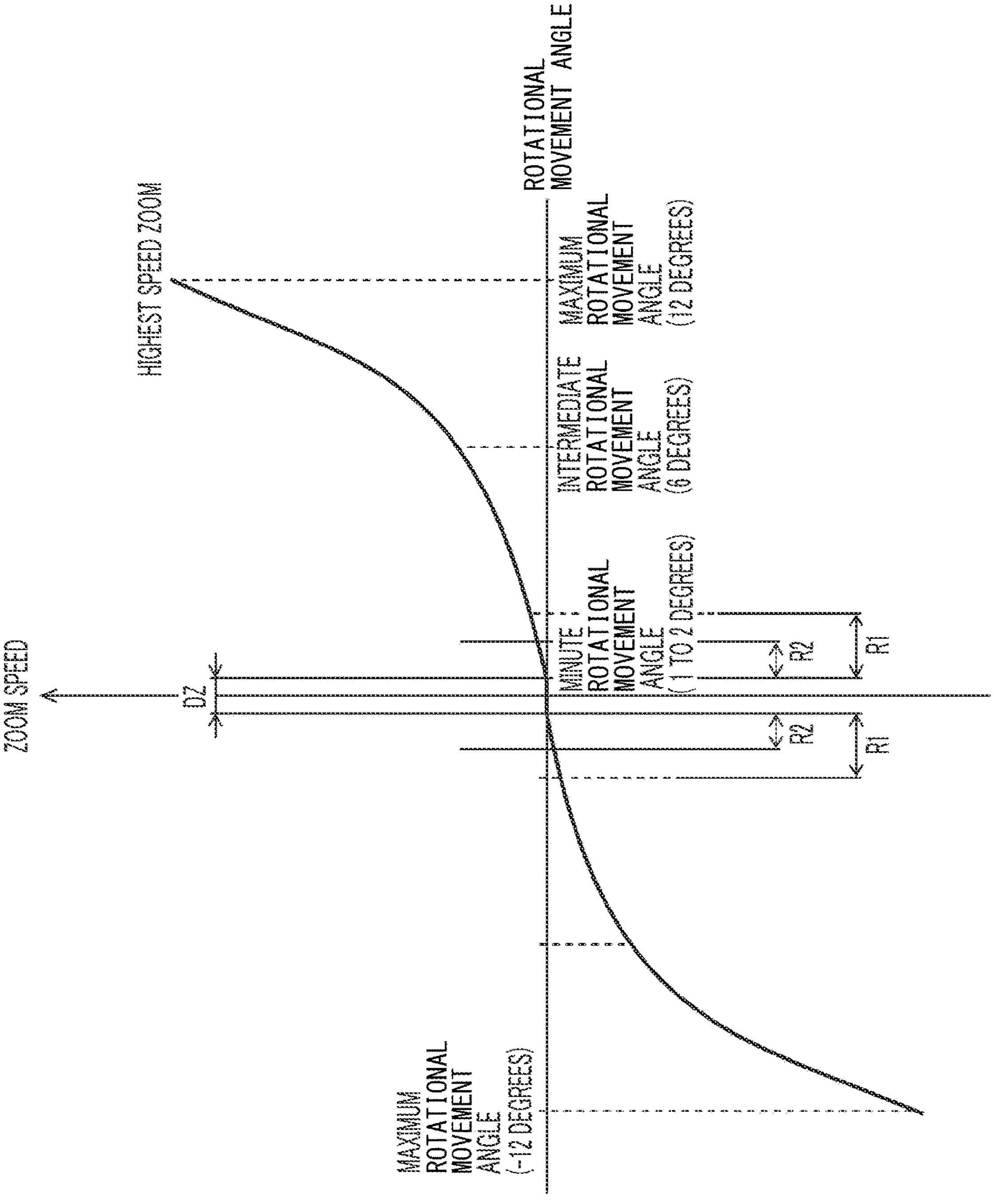
FIG. 12 is a graph showing a relationship between a rotational movement angle of the variable-speed zooming lever and a commanded zoom speed.

FIG. 12 is a graph showing an example of a relationship between the rotational movement angle of the variable-speed zooming lever and a commanded zoom speed.

As shown in FIG. 12, the variable-speed zooming lever 40 is rotationally moved within a range of the predetermined first stroke angle (±12 degrees) with reference to the reference position (zero angle). The rotational movement of the variable-speed zooming lever 40 is blocked by a stopper (not shown) for the predetermined first stroke angle or more.

The first stroke angle of 12 degrees of the variable-speed zooming lever 40 is an embodiment, and any first stroke angle may be employed within a range to be allowed in terms of operability.

In the zoom curve shown in FIG. 10, a dead zone DZ is set in a range of the second stroke angle, which is smaller than the first stroke angle, with the reference position as a reference. In a case where the rotational movement angle of the variable-speed zooming lever 40 is within the dead zone DZ, the commanded zoom speed is zero.

In the zoom curve, an angle range from the second stroke angle of the dead zone DZ to a minute rotational movement angle (for example, an angle within a range of an absolute value |one degree to two degrees|) is assigned as a slow-speed zoom region R1. Further, an angle range from the second stroke angle of the dead zone DZ to the rotational movement angle having an angle of 10% of a maximum rotational movement angle can be assigned as another slow-speed zoom region R2. In the slow-speed zoom regions R1 and R2, a zoom speed change (inclination of zoom curve) is set to be small. The reason for this is to enable fine adjustment of the variable-speed zooming in the slow-speed zoom regions R1 and R2.

Further, regarding the zoom curve, the zoom speed change (inclination of zoom curve) increases from an intermediate rotational movement angle (±6 degrees) toward the maximum rotational movement angle (±12 degrees), and a maximum zoom speed is obtained at the maximum rotational movement angle (±12 degrees). A range from the intermediate rotational movement angle to the maximum rotational movement angle corresponds to, for example, the high-speed zoom region.

The zoom speed commander 70 (FIG. 18) described below outputs the zoom speed command following the zoom curve shown in FIG. 12 according to the rotational movement angle of the variable-speed zooming lever 40 detected by the linear sensor.

Figure 13:
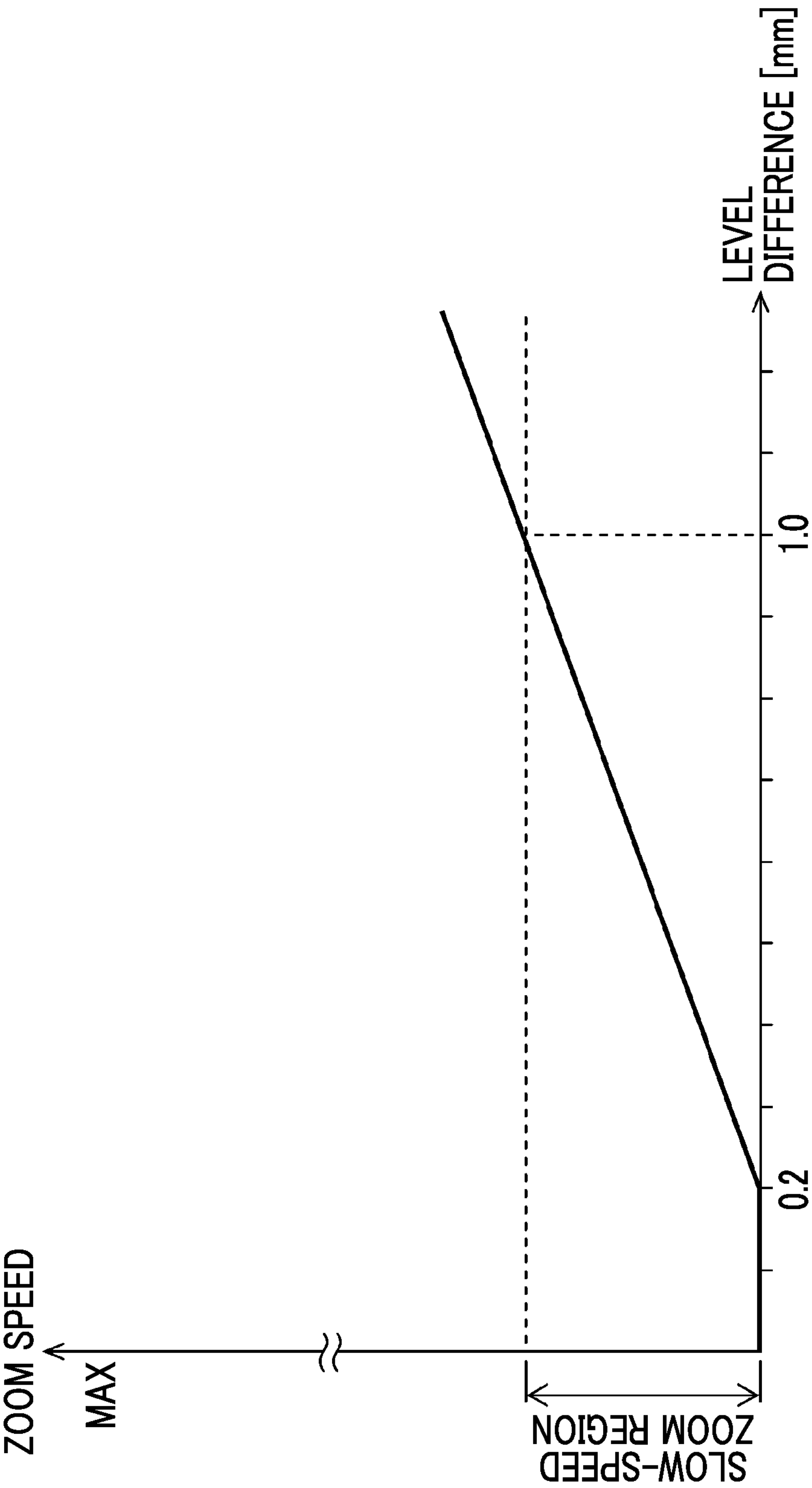
FIG. 13 is a graph showing a relationship between a level difference between a first surface formed on the variable-speed zooming lever and a second surface formed on a fixed protrusion portion and the zoom speed.

FIG. 13 is a graph showing a relationship between the level difference between the first surface formed on the variable-speed zooming lever and the second surface formed on the fixed protrusion portion and the zoom speed, and particularly, a graph showing the slow-speed zoom region.

According to Paper 1, most people can feel the concave-convex of 0.2 mm with the fingertip. However, in a case where the concave-convex is smaller than 0.2 mm, a proportion of people who can feel the concave-convex decreases in proportion to the reduction of the concave-convex.

Therefore, as shown in FIG. 13, it is preferable that the dead zone having zero zoom speed is set for the rotational movement angle (second stroke angle) of the variable-speed zooming lever 40 until the level difference between the first surface 43 of the movable protrusion portion 42 of the variable-speed zooming lever 40 and the second surface 51 of the fixed protrusion portion 50 becomes 0.2 mm. That is, it is preferable that the level difference between the first surface 43 and the second surface 51 at a boundary of the dead zone is equal to or larger than the concave-convex that can be detected by the sense of tactile of the finger.

The concave-convex (level difference between the first surface 43 and the second surface 51) that can be detected by the sense of tactile of the finger can be within a range obtained by adding a total of errors including a manufacturing error and an individual difference in detection. Further, the dead zone can be detected by feeling the level difference between the first surface 43 and the second surface 51 with the fingertip.

In a case where the variable-speed zooming lever 40 is further rotationally moved beyond the dead zone, the level difference between the first surface 43 and the second surface 51 increases substantially in proportion to the rotational movement angle.

A rotational movement range of the variable-speed zooming lever 40 in which the level difference between the first surface 43 and the second surface 51 is, for example, 0.2 mm to 1.0 mm can be assigned as the slow-speed zoom region. The level difference between the first surface 43 and the second surface 51 corresponding to the slow-speed zoom region is not limited to 0.2 mm to 1.0 mm. For example, the level difference is generated substantially in proportion to the rotational movement angle of the variable-speed zooming lever 40, and the level difference can be randomly set within a range in which the level difference can be felt with the fingertip.

With the sense of the level difference between the first surface 43 and the second surface 51 with the fingertip, the user can recognize the rotational movement amount of the variable-speed zooming lever 40 and thus the zoom speed command in the slow-speed zoom region.

<Zoom Switch>

Figure 14:
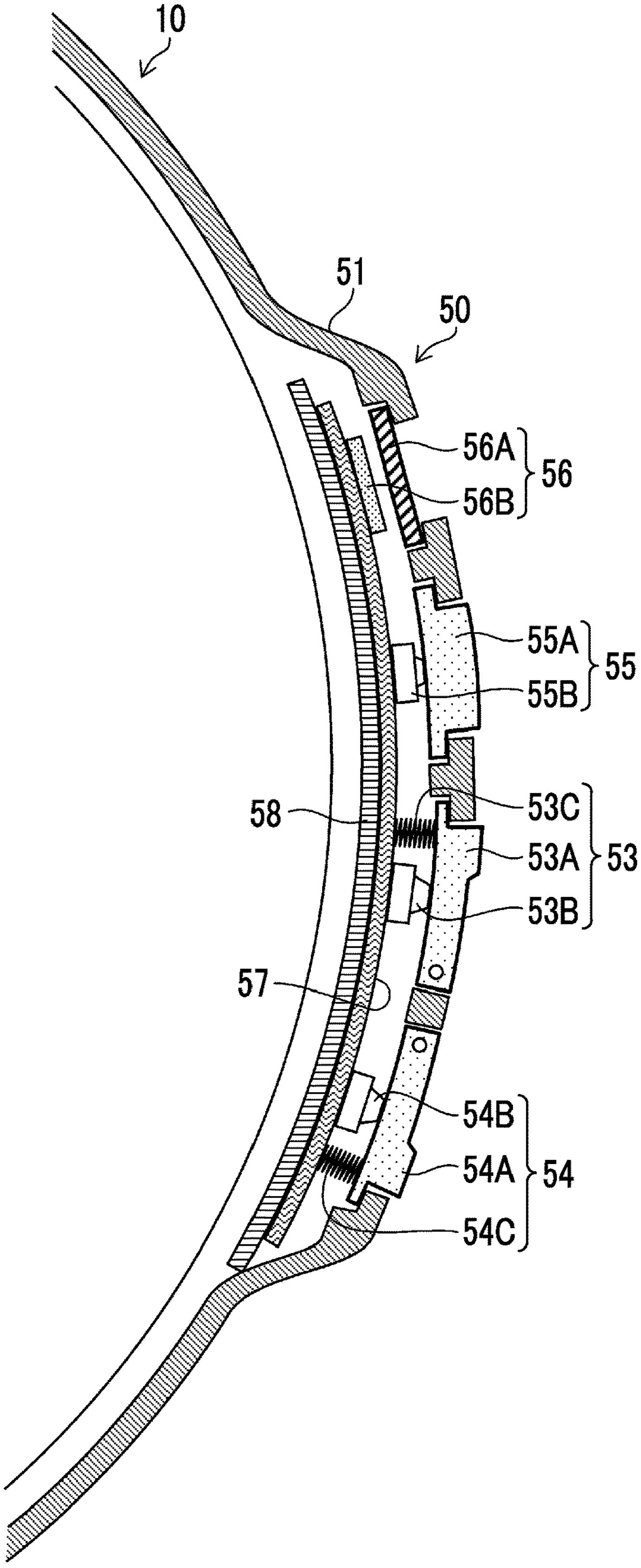
FIG. 14 is a cross-sectional view of an internal configuration of the fixed protrusion portion that constitutes a part of an outer shape of the lens barrel.

FIG. 14 is a cross-sectional view of an internal configuration of the fixed protrusion portion that constitutes the part of the outer shape of the lens barrel.

As shown in FIG. 14, the fixed protrusion portion 50 is provided with the zoom switch 53 performing the zoom operation in the telephoto direction at the fixed speed and the zoom switch 54 performing the zoom operation in the wide-angle direction at the fixed speed.

Key tops 53A and 54A of the zoom switches 53 and 54 each are provided on the fixed protrusion portion 50 by a hinge portion in a rotationally movable manner, and switches 53B and 54B are provided to face the key tops 53A and 54A. Further, the key tops 53A and 54A are always pushed up by coil springs 53C and 54C.

In the zoom switches 53 and 54, in a case where the key tops 53A and 54A are pushed down against biasing force of the coil springs 53C and 54C, the switches 53B and 54B are pushed to be turned on. In a case where the finger is released from the key tops 53A and 54A, the key tops 53A and 54A are returned by the biasing force of the coil springs 53C and 54C to cause the switches 53B and 54B to be turned off.

Further, the fixed protrusion portion 50 is provided with the focus lock switch 55 that performs the focus lock or the focus unlock. The focus lock switch 55 is a non-lock type push button switch in which the switch 55B is turned on or off each time the key top 55A is pushed down.

The display unit 56 is provided at a position adjacent to the focus lock switch 55. The display unit 56 has a configuration in which a display element 56B is disposed inside a transparent window cover 56A.

The switches 53B and 54B and the display element 56B are mounted on one flexible printed substrate 57 and are integrally incorporated into the flexible printed substrate 57. The flexible print substrate 57 is positioned at a reference boss (not shown) integral with a structure 58 and a reference hole (not shown) provided in the flexible print substrate 57. A back surface of the flexible print substrate 57 is bonded to the structure 58 using a double-sided tape to be attached not to be peeled off or shifted. The structure 58 is screwed and fixed to the lens barrel body 10 through a screw hole (not shown).

In a case where the zoom switches 53 and 54 are provided in the lens barrel body 10 as described above, it is necessary to provide switch components and wiring lines that configure a switch function inside. On the other hand, in a case where the switches are provided on the outer periphery of the lens barrel body 10, in order to provide the switch components and wiring lines or a structure for receiving switch pushing force, a trapezoidal convex portion (the fixed protrusion portion 50) is provided in many cases, due to a cylindrical internal structure of the lens barrel body 10, to provide the switch components and wiring lines, the structure, and the like in the trapezoidal convex portion. Further, in a case where the focus lock switch 55, the display unit 56, and the like, in addition to the zoom switches 53 and 54, are mounted on the same flexible print substrate 57 and are provided in the same fixed protrusion portion 50, it is configured such that the space efficiency is further improved.

In the present embodiment, the variable-speed zooming lever 40 including the movable protrusion portion 42 having the same shape as the fixed protrusion portion 50 is provided adjacent to the fixed protrusion portion 50 in which some functional components including the zoom switches 53 and 54 are housed. With the above, there is no need to provide a new convex-shaped fixed protrusion portion to know the rotational movement angle of the variable-speed zooming lever 40 with the feeling of the finger, and the internal space of the fixed protrusion portion 50 is effectively used. As a result, a configuration is achieved in which the cost and the size are minimized.

<Operations of Variable-Speed Zooming Lever, Zoom Switch, and Zoom Ring>

Figure 15:
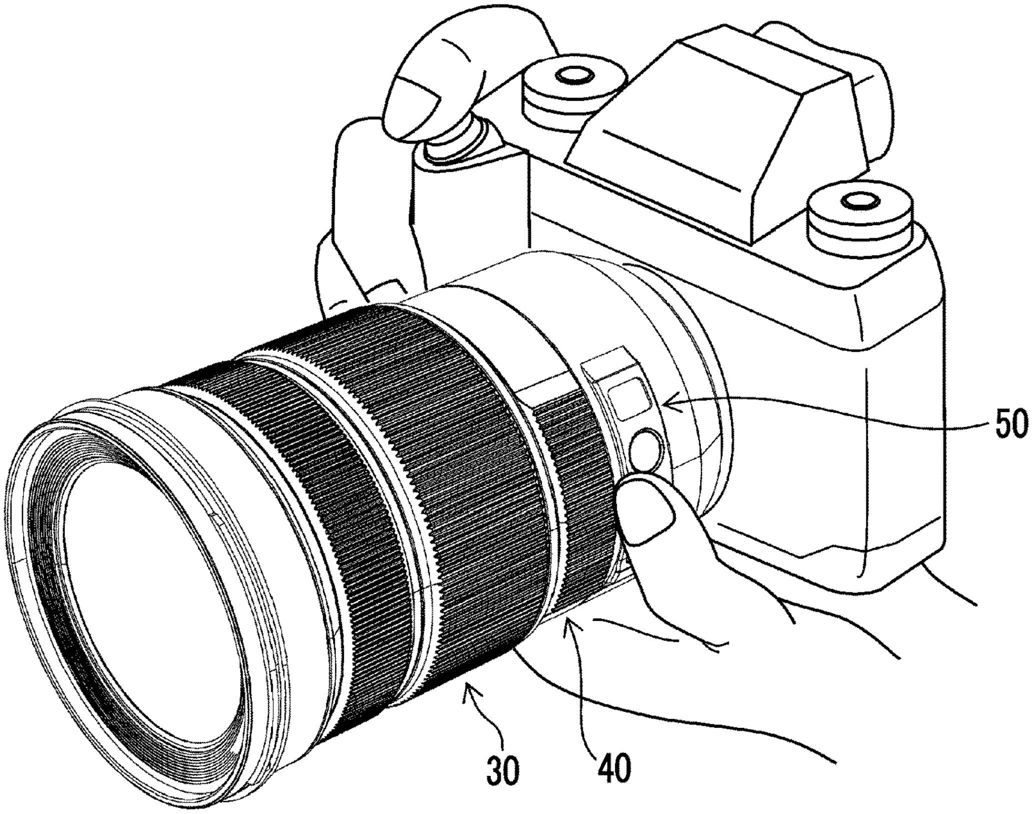
FIG. 15 is the perspective view of the imaging device including the lens barrel according to an embodiment of the present invention, and is a diagram to which an illustration of the hand operating the zoom switch is added.
Figure 16:
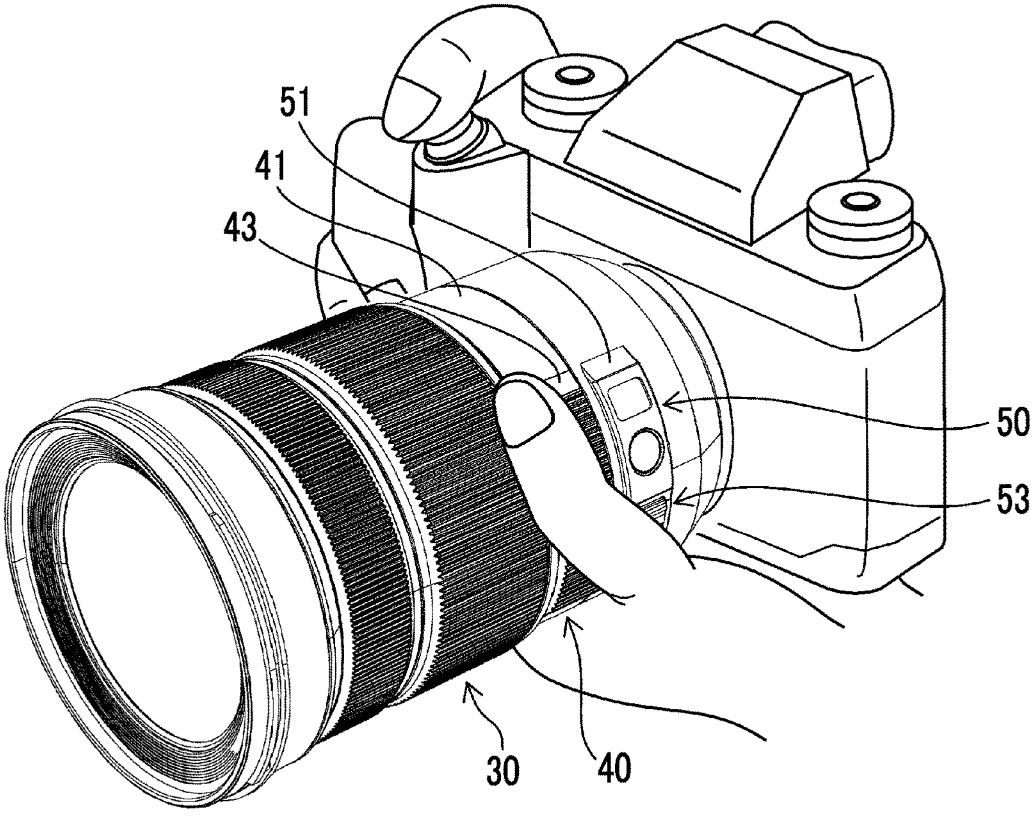
FIG. 16 is the perspective view of the imaging device including the lens barrel according to an embodiment of the present invention, and is a diagram to which the illustration of the hand operating the variable-speed zooming lever is added.
Figure 17:
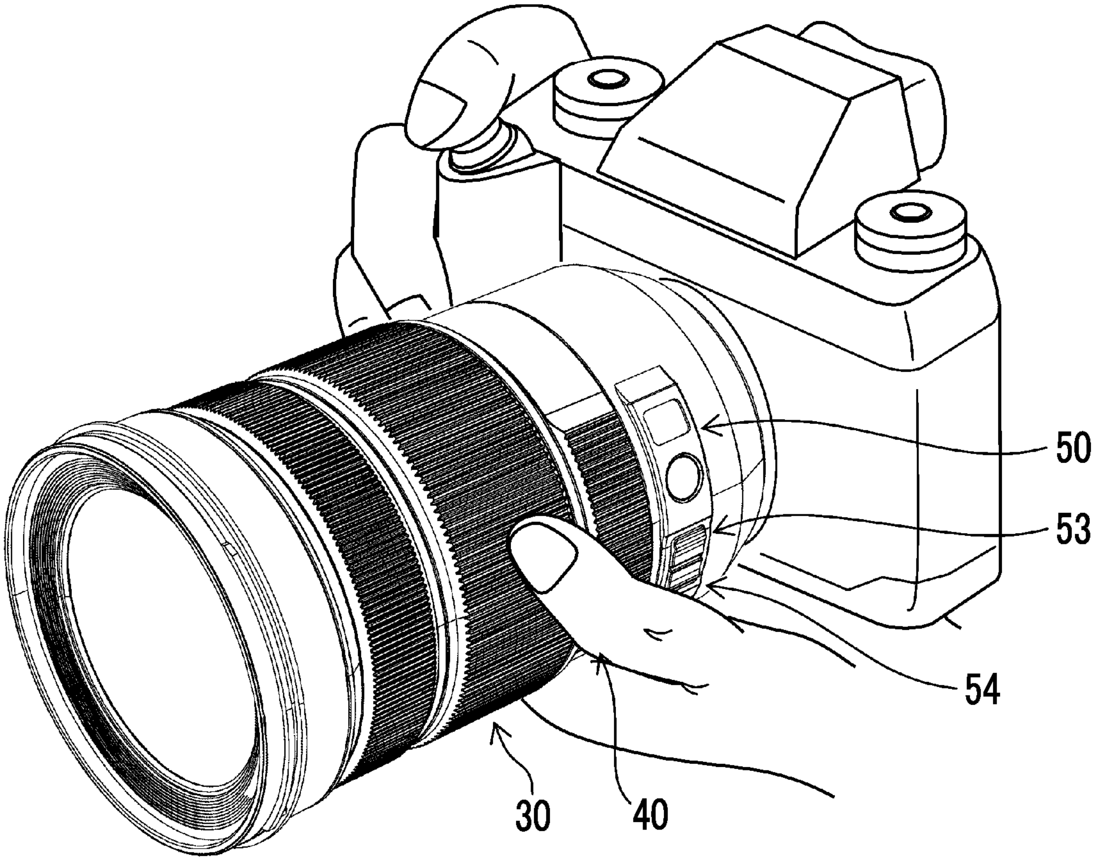
FIG. 17 is the perspective view of the imaging device including the lens barrel according to an embodiment of the present invention, and is a diagram to which the illustration of the hand operating a zoom ring is added.

Each of FIGS. 15 to 17 is the perspective view of the imaging device including the lens barrel according to an embodiment of the present invention. FIG. 15 is a diagram to which the illustration of the hand operating the zoom switch is added, FIG. 16 is a diagram to which the illustration of the hand operating the variable-speed zooming lever is added, and FIG. 17 is a diagram to which the illustration of the hand operating the zoom switch is added.

As shown in FIGS. 15 to 17, the zoom ring 30, the variable-speed zooming lever 40, and the zoom switches 53 and 54 are provided adjacent in the lens optical axis direction in this order from an objective side.

Since the user performs the zoom operation while viewing the finder or a monitor, the user is required to discriminate between the three zoom operation members (variable-speed zooming lever 40, zoom switches 53 and 54, and zoom ring 30) by groping for operating the three zoom operation members.

In FIG. 15, the zoom switches 53 and 54 closest to a front side from the user can be distinguished by being located on the front side and by having no slip prevention processing, such as knurling, on the surfaces thereof. The variable-speed zooming lever 40 can be distinguished by smoothness of the upper surface 52 of the fixed protrusion portion 50 provided with the zoom switches 53 and 54 and by the concave-convex of the key tops 53A and 54A of the zoom switches 53 and 54.

In FIG. 16, the variable-speed zooming lever 40 can be distinguished from the zoom switches 53 and 54 by being located secondly closest to the user and by the fingertip perceiving the slip prevention processing, such as knurling, on the surface of the movable protrusion portion 42 of the variable-speed zooming lever 40.

On the other hand, the variable-speed zooming lever 40 and the zoom ring 30 have the same slip prevention processing on the surfaces. However, the diameter of the movable protrusion portion 42 of the variable-speed zooming lever 40 is slightly larger than the diameter of the zoom ring 30 as described above, and the variable-speed zooming lever 40 includes the movable protrusion portion 42 having the convex shape. Therefore, the variable-speed zooming lever 40 can be distinguished from the zoom ring 30 with the fingertip.

In particular, a starting point of the movable protrusion portion 42 is a rising portion (the first surface 43) of a convex portion of the movable protrusion portion 42 being detected as the level difference with the finger in the present invention and thus is a position where the user is accustomed to touching with the finger. Therefore, the user can easily distinguish whether or not the movable protrusion portion 42 is present.

In FIG. 17, the zoom ring 30 farthest from the user is the same as the variable-speed zooming lever 40 in terms of the presence or absence of the slip prevention processing on the surface, but the zoom ring 30 can be distinguished by the presence or absence of the movable protrusion portion 42. As described above, the user is accustomed to touching the first surface 43, which is the starting point of the rising portion of the movable protrusion portion 42, to control slow-speed zoom of the variable-speed zooming. Therefore, the user can quickly find the zoom ring 30 only with the tactile sense and thus a speedy operation change is possible.

Further, the variable-speed zooming lever 40 and the zoom ring 30 are related operation members. With the fact that the speedy operation change is possible without requiring visual observation even while being disposed close together, in a case of a lens for movie imaging that needs to be operated without viewing away from the finder, there is a further significant advantage in terms of operability of the lens for movie imaging, which is effective in product differentiation. Furthermore, in the configuration in which the zoom switches 53 and 54 are provided on the upper surface of the fixed protrusion portion 50, the operation change of the three zoom operations of the variable-speed zooming operation by the variable-speed zooming lever 40, the zoom operation according to the rotation amount by the zoom ring 30, and the constant-speed zoom operation by the zoom switches 53 and 54 can be performed as necessary without viewing away from the finder and with minimum movement of the hand, which generates an unprecedented significant effect in terms of operability.

<Drive Control of Optical System>

Figure 18:
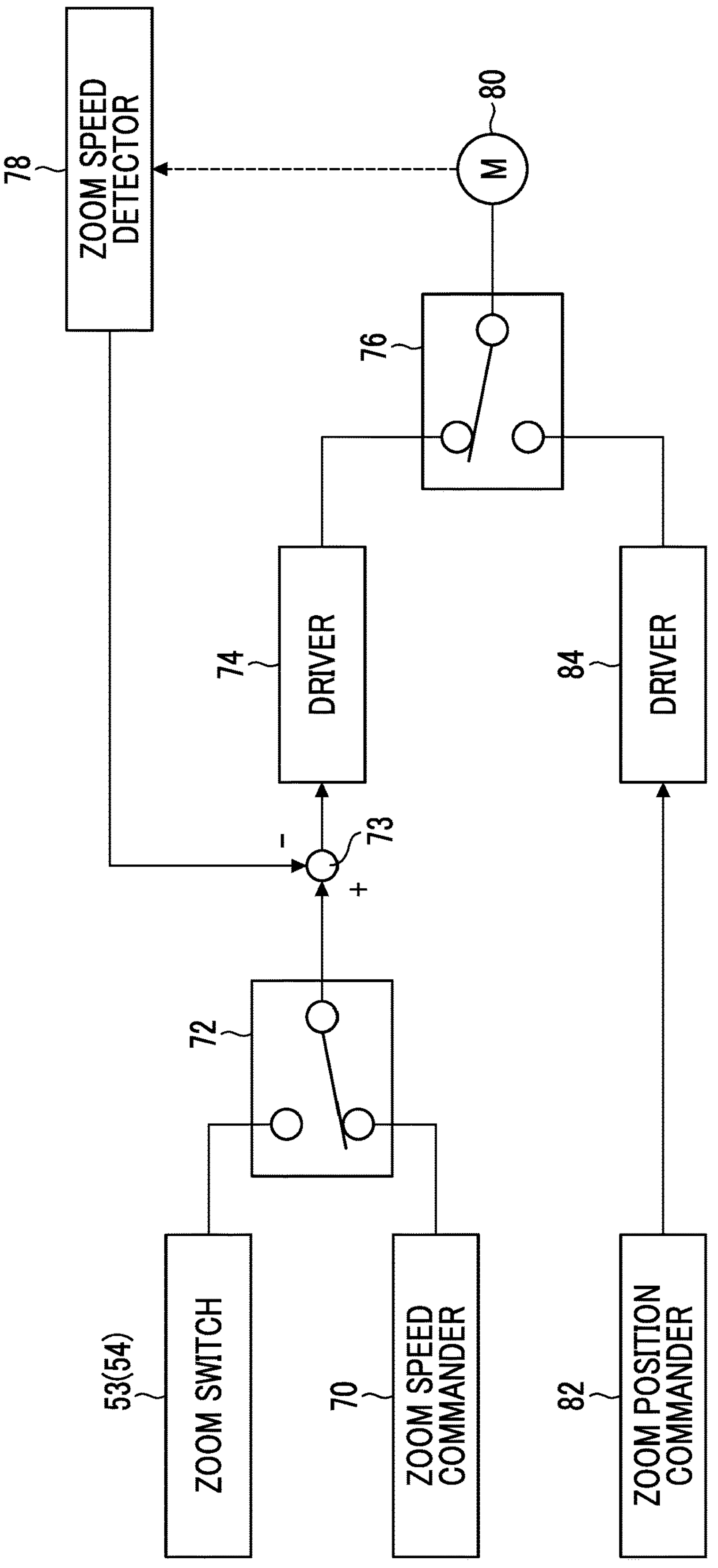
FIG. 18 is a block diagram showing an embodiment of a drive controller of an optical system in the lens barrel according to an embodiment of the present invention.

FIG. 18 is a block diagram showing an embodiment of a drive controller of an optical system in the lens barrel according to an embodiment of the present invention, and particularly shows the drive controller that drives the zoom lens.

In FIG. 18, the zoom switches 53 and 54 each are switches that output the zoom speed command of the fixed speed. The zoom switch 53 is a switch to issue a command for zoom-up at the fixed speed, and the zoom switch 54 is a switch to issue a command for zoom-down at the fixed speed.

The zoom speed commander 70 includes the linear sensor (not shown) that detects the rotational movement angle of the variable-speed zooming lever 40, and outputs the zoom speed command following the zoom curve as shown in FIG. 12 according to the rotational movement angle of the variable-speed zooming lever 40, which is detected by the linear sensor.

The zoom speed command of the fixed speed from the zoom switches 53 and 54 and the zoom speed command of a variable speed from the zoom speed commander 70 are applied to a first changeover switch 72.

In a case where the zoom switches 53 and 54 are operated, the first changeover switch 72 outputs the zoom speed command of the fixed speed from the zoom switches 53 and 54 to a positive input of an adder 73. In a case where the variable-speed zooming lever 40 is operated, the first changeover switch 72 outputs the zoom speed command of the variable speed from the zoom speed commander 70 to the positive input of the adder 73.

A current zoom speed detection signal of the zoom lens in the lens barrel 1 is applied to a negative input of the adder 73 from the zoom speed detector 78, and the adder 73 outputs a signal indicating a difference between these two inputs to a driver 74 as the operation amount.

The driver 74 drives a zoom motor 80 via a second changeover switch 76 such that the zoom speed of the zoom lens matches the zoom speed indicated by the zoom speed command from the zoom switches 53 and 54 or the zoom speed commander 70, according to the input operation amount.

The zoom motor 80 can change the zoom magnification by, for example, rotationally moving a zoom cam ring to move the variable magnification lens and the correction lens constituting the zoom lens in the optical axis direction, respectively. Further, with control of a rotational movement speed of the zoom cam ring in response to the zoom speed command, it is possible to control the zoom speed.

The present invention is not limited to a case where the zoom cam ring is rotationally moved to drive the variable magnification lens and the correction lens. A ball nut screw may be rotated by the zoom motor 80 to move the variable magnification lens, and the correction lens may be controlled to be moved by another driving unit, according to a movement position of the variable magnification lens, such that a focal position does not move.

Further, the zoom speed detector 78 can be configured of an encoder that detects a rotation direction or rotation position of the zoom motor 80, and can detect a rotation speed (current zoom speed) of the zoom motor 80 by differentiating a signal indicating the rotation position by time.

A zoom position commander 82 is configured of an encoder (not shown) that detects the rotation amount of the zoom ring 30, and outputs a zoom position command indicating the zoom position relative to a current zoom position according to the rotation amount of the zoom ring 30 detected by the encoder.

The zoom position command output from the zoom position commander 82 is output to a driver 84, and a drive signal corresponding to the zoom position command is generated here. The drive signal corresponding to the zoom position command generated by the driver 84 is output to the zoom motor 80 via the second changeover switch 76, and the zoom motor 80 moves the variable magnification lens and the correction lens constituting the zoom lens. That is, the variable magnification lens and the correction lens constituting the zoom lens are moved to positions corresponding to the zoom position command output from the zoom position commander 82.

The second changeover switch 76 is switched to select the drive signal from the driver 74 in a case where the zoom speed of the zoom lens is controlled, and is switched to select the drive signal from the driver 84 in a case where the zoom position of the zoom lens is controlled.

The zoom operation of performing the fixed speed control by the operation of the zoom switches 53 and 54, the zoom operation of performing the variable speed control by the operation of the variable-speed zooming lever 40 (the zoom speed commander 70), and the zoom operation of performing the zoom position control by the operation of the zoom ring 30 (the zoom position commander 82) are not limited to the embodiment shown in FIG. 18, and various drive control systems can be applied.

Other

Although the lens barrel of the present embodiment is an interchangeable lens that can be attached to and detached from an interchangeable-lens imaging device body, the present invention is not limited thereto. The lens barrel of the present embodiment may be integrated with the imaging device.

Further, in the present embodiment, the optical system, which is a target for the speed control in the lens barrel, is the zooming optical system (zoom lens), but the present invention is not limited thereto. For example, the focus optical system (focus lens) may be a target for the speed control.

Furthermore, the present invention is not limited to the embodiments described above, and it is needless to say that the modifications can be made without departing from the spirit of the present invention.

EXPLANATION OF REFERENCES

1: lens barrel
10: lens barrel body
20: focus ring
30: zoom ring
40: variable-speed zooming lever
41: small-diameter portion
42: large-diameter portion (movable protrusion portion)
43: first surface
50: fixed protrusion portion
51: second surface
52: upper surface
53, 54: zoom switch
53A, 54A, 55A: key top
53B, 54B, 55B: switch
53C, 54C: coil spring
55: focus lock switch
56: display unit
56A: window cover
56B: display element
57: flexible print substrate
58: structure
70: zoom speed commander
72: first changeover switch
73: adder
74, 84: driver
76: second changeover switch
78: zoom speed detector
80: zoom motor
82: zoom position commander
DZ: dead zone
R1, R2: slow-speed zoom region

What is claimed is:

1. A lens barrel comprising:
a first member that is provided along an outer periphery of a lens barrel body;
a second member that is provided along the outer periphery of the lens barrel body; and
a zoom speed commander that issues a command for a zoom speed of electric zoom according to relative movement of the first member and the second member,
wherein the first member has a first surface,
the second member has a second surface,
the first surface is flush with the second surface in a case where a position of the first member is a reference position, and the first member and the second member are movable relative to each other,
the first member is provided along the outer periphery of the lens barrel body in a rotationally movable manner,
the zoom speed commander has a dead zone where a level difference between the first surface and the second surface is generated by rotational movement of the first member in a first direction or a second direction opposite to the first direction from the reference position, while the zoom speed to be commanded does not change from zero, and the first member is rotationally moved within a range of a first stroke angle, and a second stroke angle set in the dead zone is smaller than the first stroke angle.

2. The lens barrel according to claim 1, wherein the first member has a cylindrical shape or an arc shape.

3. The lens barrel according to claim 1, wherein the first member is provided along the outer periphery of the lens barrel body in a rotationally movable manner, and a position of the first surface of the first member is rotatably displaced in a circumferential direction in a case where the first member is rotationally moved.

4. The lens barrel according to claim 1, wherein the second member is fixed to the lens barrel body.

5. The lens barrel according to claim 1, wherein the second member is adjacent to the first member and configures a part of an outer shape of the lens barrel body.

6. The lens barrel according to claim 1, wherein the first member is provided along the outer periphery of the lens barrel body in a rotationally movable manner, in a case where the first member is rotationally moved in a first direction from the reference position, a first level-difference corresponding to a rotational movement amount is generated between the first surface and the second surface, and in a case where the first member is rotationally moved in a second direction opposite to the first direction from the reference position, a second level-difference in a direction opposite to the first level-difference, which corresponds to a rotational movement amount, is generated between the first surface and the second surface.

7. The lens barrel according to claim 1, further comprising:

a return member that returns the first member to the reference position.

8. The lens barrel according to claim 1, wherein the first member has a small-diameter portion and a large-diameter portion, and the first surface is configured of a surface that connects a level difference of diameters of the small-diameter portion and the large-diameter portion.

9. The lens barrel according to claim 8, wherein the second member configures a part of an outer shape of the lens barrel body, the part of the outer shape of the lens barrel body has a first outer shape corresponding to the small-diameter portion of the first member, the second member has a second outer shape corresponding to the large-diameter portion of the first member, and the second surface is configured of a surface that connects a level difference between the first outer shape of the lens barrel body and the second outer shape of the second member.

10. The lens barrel according to claim 1, wherein the first member and the second member are provided adjacent to each other in a lens optical axis direction, and the first surface of the first member and the second surface of the second member are simultaneously contactable with the same finger.

11. The lens barrel according to claim 1, wherein the first surface and the second surface are configured of inclined surfaces.

12. The lens barrel according to claim 1, further comprising:

a third member that performs a zoom operation at a fixed speed.

13. The lens barrel according to claim 12, wherein the third member is a zoom switch that is provided in the second member to issue an instruction to perform zoom-up and zoom-down.

14. The lens barrel according to claim 12, further comprising:

a cylindrical-shaped fourth member that is rotatably disposed along the outer periphery of the lens barrel body; and a zoom position commander that issues a command for a zoom position of electric zoom according to a rotation amount of the fourth member.

15. The lens barrel according to claim 14, wherein the first member, the third member, and the fourth member are disposed adjacent to each other in an order of the fourth member, the first member, and the third member from an objective side of the lens barrel body.

16. The lens barrel according to claim 14, wherein the first member and the fourth member have outer diameters similar to each other to such a degree that the outer diameters are felt to be equal to each other by a sense of tactile of a gripping finger.

17. A lens barrel comprising:

a first member that is provided along an outer periphery of a lens barrel body;

a second member that is provided along the outer periphery of the lens barrel body;

a zoom speed commander that issues a command for a zoom speed of electric zoom according to relative movement of the first member and the second member, wherein the first member has a first surface, the second member has a second surface, the first surface is flush with the second surface in a case where a position of the first member is a reference position, and the first member and the second member are movable relative to each other, the first member is provided along the outer periphery of the lens barrel body in a rotationally movable manner, the zoom speed commander has a dead zone where a level difference between the first surface and the second surface is generated by rotational movement of the first member in a first direction or a second direction opposite to the first direction from the reference position, while the zoom speed to be commanded does not change from zero, the level difference between the first surface and the second surface at a boundary of the dead zone is equal to or larger than a concave-convex that is detectable by a sense of tactile of a finger, and the concave-convex is within a range obtained by adding a total of errors including a manufacturing error and an individual difference in detection.

* * * * *